United States Patent
Li et al.

(10) Patent No.: US 11,696,158 B2
(45) Date of Patent: Jul. 4, 2023

(54) NETWORK DATA ANALYTICS IN A COMMUNICATIONS NETWORK

(71) Applicant: IPLA HOLDINGS INC., New York, NY (US)

(72) Inventors: Hongkun Li, Malvern, PA (US); Michael F. Starsinic, Newtown, PA (US); Rocco Di Girolamo, Laval (CA); Catalina Mihaela Mladin, Hatboro, PA (US)

(73) Assignee: IPLA HOLDINGS INC., New York, NY (US)

( * ) Notice: Subject to any disclaimer, the term of this patent is extended or adjusted under 35 U.S.C. 154(b) by 105 days.

(21) Appl. No.: 17/326,963

(22) Filed: May 21, 2021

(65) Prior Publication Data
US 2021/0282038 A1 Sep. 9, 2021

Related U.S. Application Data

(63) Continuation of application No. 16/637,463, filed as application No. PCT/US2018/046224 on Aug. 10, 2018, now Pat. No. 11,051,192.

(60) Provisional application No. 62/544,399, filed on Aug. 11, 2017.

(51) Int. Cl.
*G06F 15/173* (2006.01)
*H04W 24/08* (2009.01)

(52) U.S. Cl.
CPC .................................. *H04W 24/08* (2013.01)

(58) Field of Classification Search
CPC ...... H04W 24/08; H04W 48/18; H04L 41/14; H04L 41/5096

USPC .......................................................... 709/224
See application file for complete search history.

(56) References Cited

U.S. PATENT DOCUMENTS

| | | |
|---|---|---|
| 9,565,079 B1 | 2/2017 | Hawthorne |
| 2014/0207945 A1 | 7/2014 | Galloway et al. |
| 2016/0373941 A1 | 12/2016 | Daijavad et al. |
| 2017/0104609 A1 | 4/2017 | Mcnamee et al. |
| 2017/0303259 A1 | 10/2017 | Lee et al. |
| 2018/0227873 A1* | 8/2018 | Vrzic .................... H04W 28/26 |
| 2018/0262924 A1 | 9/2018 | Dao et al. |
| 2020/0177677 A1 | 6/2020 | Yang et al. |

OTHER PUBLICATIONS

3GPP TR 23.718 V13.0.0, "3rd Generation Partnership Project; Technical Specification Group Services and System Aspects; Architecture Enhancement for Flexible Mobile Service Steering (Release 13)", Sep. 2015, 38 pages.
3GPP TR 23.720 V13.0.0, "3rd Generation Partnership Project; Technical Specification Group Services and System Aspects; Study on Architecture Enhancements for Cellular Internet of Things (Release 13)", Mar. 2016, 94 pages.
3GPP TR 23.799 V14.0.0, "3rd Generation Partnership Project; Technical Specification Group Services and System Aspects; Study on Architecture for Next Generation System (Release 14)", Dec. 2016, 522 pages.

(Continued)

*Primary Examiner* — Lan Dai T Truong
(74) *Attorney, Agent, or Firm* — Chip Law Group

(57) ABSTRACT

A network data analytics function, which may be implemented as a service, is disclosed which provides a new and improved network data analytics capability in 5G core networks.

23 Claims, 21 Drawing Sheets

(56) References Cited

OTHER PUBLICATIONS

3GPP TS 23.401 V13.10.0, 3rd Generation Partnership Project; Technical Specification Group Services and System Aspects; General Packet Radio Service (GPRS) Enhancements for Evolved Universal Terrestrial Radio Access Network (E-UTRAN) Access (Release 13), Mar. 2017, 375 pages.

3GPP TS 23.501 V1.1.0, "3rd Generation Partnership Project; Technical Specification Group Services and System Aspects; System Architecture for the 5G System Stage 2 (Release 15)", Jul. 2017, 165 pages.

3GPP TS 23.502 V0.5.0, "3rd Generation Partnership Project; Technical Specification Group Services and System Aspects; Procedures for the 5G System; Stage 2 (Release 15)", Jul. 2017, 148 pages.

3GPP TS 23.682 V13.5.0, "3rd Generation Partnership Project; Technical Specification Group Services and System Aspects; Architecture Enhancements to Facilitate Communications With Packet Data Networks and Applications (Release 13)", Mar. 2016, 90 pages.

ETSI GS NFV 002 V1.1.1, "Network Functions Virtualisation (NFV); Architectural Framework", Oct. 2013, 21 pages.

NGMN Alliance, NGMN 5G P1 Requirements & Architecture Work Stream End-to-End Architecture, "Description of Network Slicing Concept", Jan. 13, 2016, 7 pags.

OneM2M TS-0001 V2.3.0, Technical Specification, "Functional Architecture" Aug. 7, 2015, 352 pages.

SA WG2 Meeting #125 S2-180287, Huawei et al., "Key Issue of FS-eNA on Service Based Resource Management", Jan. 2018, 2 pages.

SA WG2 Meeting #125 S2-181232, China Mobile, "Key Issue on How to Get Service Information AF", Jan. 2018, 2 pages.

Huawei et al., "S2-170685_0533_0466_Description on NF service registration_v1.6" <3GPP tsg_sa \WG2_Arch> Jan. 23, 2017 Full text.

\* cited by examiner

NETWORK DATA ANALYTICS IN A COMMUNICATIONS NETWORK

CROSS-REFERENCE TO RELATED APPLICATIONS

This application is a continuation of U.S. patent application Ser. No. 16/637,463, filed Feb. 7, 2020, which is a National Stage Application of International Patent Application No. PCT/US2018/046224, filed Aug. 10, 2018, which claims the benefit of U.S. Provisional Patent Application No. 62/544,399, filed Aug. 11, 2017, the disclosure of which is hereby incorporated by reference in its entirety.

BACKGROUND

The Third Generation Partnership Project (3GPP) is designing a 5G network and is considering to incorporate network slicing technology. This technology is a good fit for the 5G network, because the 5G use cases (e.g., massive Internet of Things (IoT)), critical communications, and enhanced mobile broadband) demand very diverse and sometimes extreme requirements. The current pre-5G architecture utilizes a relatively monolithic network and transport framework to accommodate a variety of services such as mobile traffic from smart phones, over-the-top (OTT) content, feature phones, data cards, and embedded machine-to-machine (M2M) devices. It is anticipated that the current architecture is not flexible and scalable enough to efficiently support a wider range of business needs when each has its own specific set of performance, scalability and availability requirements. Furthermore, introduction of new network services should be made more efficient. Nevertheless, several use cases are anticipated to be active concurrently in the same operator network, thus requiring a high degree of flexibility and scalability of the 5G network.

In the 5G network architecture currently under development by 3GPP, Network Data Analytics (NWDA) is defined as a network function to represent operator managed network analytics. NWDA provides network slice specific network data analytics to the Policy Control Function (PCF). The subscription to NWDA by PCF is on a network slice level and the NWDA is not required to be aware of the current subscribers using the slice. NWDA notifies/publishes slice specific network status analytic information to the PCF(s) that are subscribed to it. This information is not subscriber specific. PCF uses that data in its policy decisions.

Also in the 5G network architecture currently under development by 3GPP, two types of data storage network functions (DSF) have been defined: (1) a structured DSF, and (2) an unstructured DSF. The 5G system architecture allows any network function to store and retrieve its unstructured data into/from a UDSF. The UDSF belongs to the same Public Land Mobile Network (PLMN) where the network function is located. Control plane network functions (NFs) may share a UDSF for storing their respective unstructured data or may each have their own UDSF (e.g. a UDSF may be located close to the respective network function). The UDSF is an optional function that supports Storage and retrieval of information as unstructured data by any network function.

The 5G system architecture also allows the Network Exposure Function (NEF) to store structured data in the SDSF intended for external and internal network exposure by the NEF. SDSF belongs to the same PLMN where the NEF is located. The SDSF is an optional function that supports storage and retrieval of information as structured data by the NEF.

SUMMARY

Currently, the usage of NWDA is limited to provide network status (e.g. congestion level) to the PCF and the PCF will use the information to make policy decisions. However, in order to provide the analytics, it is not clear what information NWDA needs to collect, how it collects this information, and what the analytics information consists of beyond slice specific congestion information. Therefore, it is desired to define what information to collect by the NWDA and what types of analytics NWDA provides. There is also a need to define the mechanisms for information collection.

In addition, the network data analytics could benefit not only the policy related procedures, but also some other important network management processes, such as network function selection, mobility management and session management. In other words, NWDA should be able to interact with some network functions other than PCF to facilitate those procedures. Therefore, new interface and methods are needed to define how the NWDA interacts with other network functions and with the SCS/AS for providing the network data analytics. This is especially important for IoT applications, since there are usually a large number of IoT devices/connections, which may produce a large amount of data records. The network data analytics capability could supply critical statistics to network entities, network operator and service provider for more efficient network operation.

Addressing these and other shortcomings, disclosed hereinafter are new types of network data analytics and mechanisms for a new NWDA framework, which enable a new and improved network data analytics capability in 5G core network.

According to one aspect, mechanisms are disclosed for NWDA to collect various information from NFs and SCS/AS for generating network data analytics. Specifically, NWDA can collect the information by using subscription/notification model or request/response model.

According to another aspect, new types of network data analytics are described that NWDA can provide to NFs (mainly AMF, SMF, PCF and UPF) and the SCS/AS.

According to yet another aspect, methods are described for the SCS/AS to get network data analytics from NWDA. Specifically, the SCS/AS could obtain the network data analytics from NWDA via subscription/notification model or request/response model.

According to a further aspect, mechanisms are disclosed for NWDA to register with NRF, and provide the available types of data analytics, so that any NF or SCS/AS is able to discover available types of data analytics through a discovery process with the NRF.

Still further, procedures are described for storing network data analytics at a DSF. This implies the idea of splitting computing capability and storage capability within a 5G network that facilitates network entities to be able to retrieve network data analytics without contacting NWDA.

In addition, methods are described for performing a composite data analytics based on a network entity's demand, and new services are defined regarding the network data analytics provisioning for different NFs.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

A more detailed understanding may be had from the following description, given by way of example in conjunction with the accompanying drawings wherein.

DETAILED DESCRIPTION OF ILLUSTRATIVE EMBODIMENTS

Figure 1:
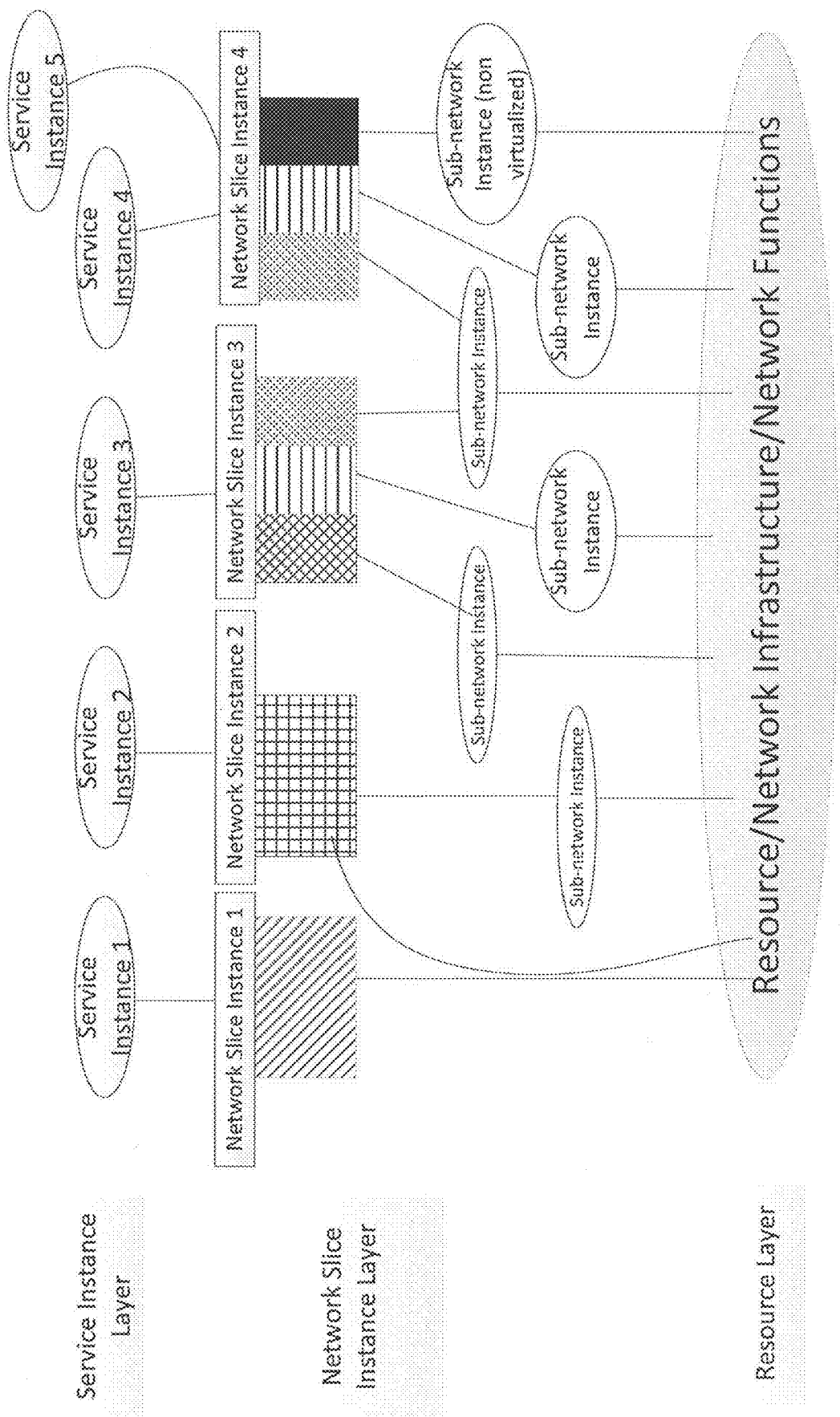
FIG. 1 illustrate the concept of network slicing.

The following is a list of acronyms that may appear in the following description. Unless otherwise specified, the acronyms used herein refer to the corresponding terms listed below:

AMF Access and Mobility Management Function
AS Application Server
CM Connection Management
CN Core Network
CP Control Plane
DL Downlink
DSF Data Storage Network Function
SDSF Structured DSF
UDSF Unstructured DSF
HSS Home Subscriber Server
IMSI International Mobile Subscriber Identity
LTE Long Term Evolution
MM Mobility Management
MME Mobility Management Entity
MO Mobile Originated
MT Mobile Terminated
NAS Non Access Stratum
NEF Network Exposure Function
NF Network Function
NIDD Non-IP Data Delivery
NRF NF Repository Function
NWDA Network Data Analytics
PCF Policy Control Function
PDN Packet Data Network
PDU Packet Data Unit
P-GW PDN Gateway
QoS Quality of Service
RAN Radio Access Network
RAT Radio Access Technology
SCS Service Capability Server
SCEF Service Capability Exposure Function
SGSN Serving GPRS Support Node
S-GW Serving Gateway
SMF Session Management Function
UE User Equipment
UL Uplink
UPF User Plane Function The following terms may have the following meanings:

A "Network Function (NF)" may be a processing function in a network, which has defined functional behavior and defined interfaces. An NF can be implemented either as a network element on a dedicated hardware, or as a software instance running on a dedicated hardware, or as a virtualized function instantiated on an appropriate platform, e.g. on a cloud infrastructure.

A "Network Slice Template" may be a set of NW functions that support certain application profile(s).

A "Network Slice Instance" may be an instantiation of a NW Slice Template.

A "Network Data Analytics Function (NWDAF)" may represent operator managed network analytics logical function. According to the latest version [9], NWDAF provides slice specific network data analytics to the PCF. NWDAF provides network data analytics to PCF on a network slice level and the NWDAF is not required to be aware of the current subscribers using the slice. It is also possible that NWDAF provides other types of network data analytics to network functions in addition to the PCF within the mobile core network.

A "PDU session" may be an association between the UE and a data network that provides a PDU Connectivity Service. Two types of PDU sessions are defined: (1) IP Type data network is IP type; and (2) Non-IP type—data network is non-IP.

A "UE Capability Profile" may describe what a UE is capable of doing. This profile is typically static. For example, if the UE has relay capabilities, the UE's category (e.g. maximum data rate), screen size, voice capable, IMS capable, GPS capable, etc. This information may be kept in the UE subscription configuration and/or SIM.

"Session Management in 3GPP CN" refers to session management in a 3GPP CN. In 3GPP CN, session management is to manage the end-to-end PDN connection (IP or non-IP type) between UE and packet data network for the data transfer through the core network with policy (e.g., QoS) and charging control enforced.

Example Network Architectures

The 3rd Generation Partnership Project (3GPP) develops technical standards for cellular telecommunications network technologies, including radio access, the core transport network, and service capabilities—including work on codecs, security, and quality of service. Recent radio access technology (RAT) standards include WCDMA (commonly referred as 3G), LTE (commonly referred as 4G), and LTE-Advanced standards. 3GPP has begun working on the standardization of next generation cellular technology, called New Radio (NR), which is also referred to as "5G." 3GPP NR standards development is expected to include the definition of next generation radio access technology (new RAT), which is expected to include the provision of new flexible radio access below 6 GHz, and the provision of new ultra-mobile broadband radio access above 6 GHz. The flexible radio access is expected to consist of a new, non-backwards compatible radio access in new spectrum below 6 GHz, and it is expected to include different operating modes that can be multiplexed together in the same spectrum to address a broad set of 3GPP NR use cases with diverging requirements. The ultra-mobile broadband is expected to include cmWave and mmWave spectrum that will provide the opportunity for ultra-mobile broadband access for, e.g., indoor applications and hotspots. In particular, the ultra-mobile broadband is expected to share a common design framework with the flexible radio access below 6 GHz, with cmWave and mmWave specific design optimizations.

Network slicing is a mechanism that could be used by mobile network operators to support multiple 'virtual' networks behind the air interface across the fixed part of the mobile operator's network, both backhaul and core network. This involves 'slicing' the network into multiple virtual networks to support different radio access networks (RANs) or different service types running across a single RAN. Network slicing enables the operator to create networks customized to provide optimized solutions for different market scenarios which demands diverse requirements, e.g. in the areas of functionality, performance, and isolation. FIG. 1 shows a conceptual architecture of network slicing. A network slice instance is made up of a set of network functions and the resources to run these network functions. The different shading is used to indicate the different network slice instances or sub-network slice instances. A sub-network slice instance comprises a set of network functions and resources to run those network functions, but is not in itself a complete logical network. A sub-network slice instance may be shared by multiple network slice instances.

Network slicing enables the operator to create networks customized to provide optimized solutions for different market scenarios which demand diverse requirements, e.g. in the areas of functionality, performance and isolation. However, there are some challenges and issues to support network slicing in the future 5G network, for example:

How to achieve isolation/separation between network slice instances and which levels and types of isolation/separation will be required;

How and what type of resource and network function sharing can be used between network slice instances;

How to enable a user equipment (UE) to simultaneously obtain services from one or more specific network slice instances of one operator;

What is within 3GPP scope with regards to Network Slicing (e.g. network slice creation/composition, modification, deletion);

Which network functions may be included in a specific network slice instance, and which network functions are independent of network slices;

The procedure(s) for selection of a particular Network Slice for a UE;

How to support Network Slicing Roaming scenarios;

How to enable operators to use the network slicing concept to efficiently support multiple 3rd parties (e.g. enterprises, service providers, content providers, etc.) that require similar network characteristics.

Figure 2:
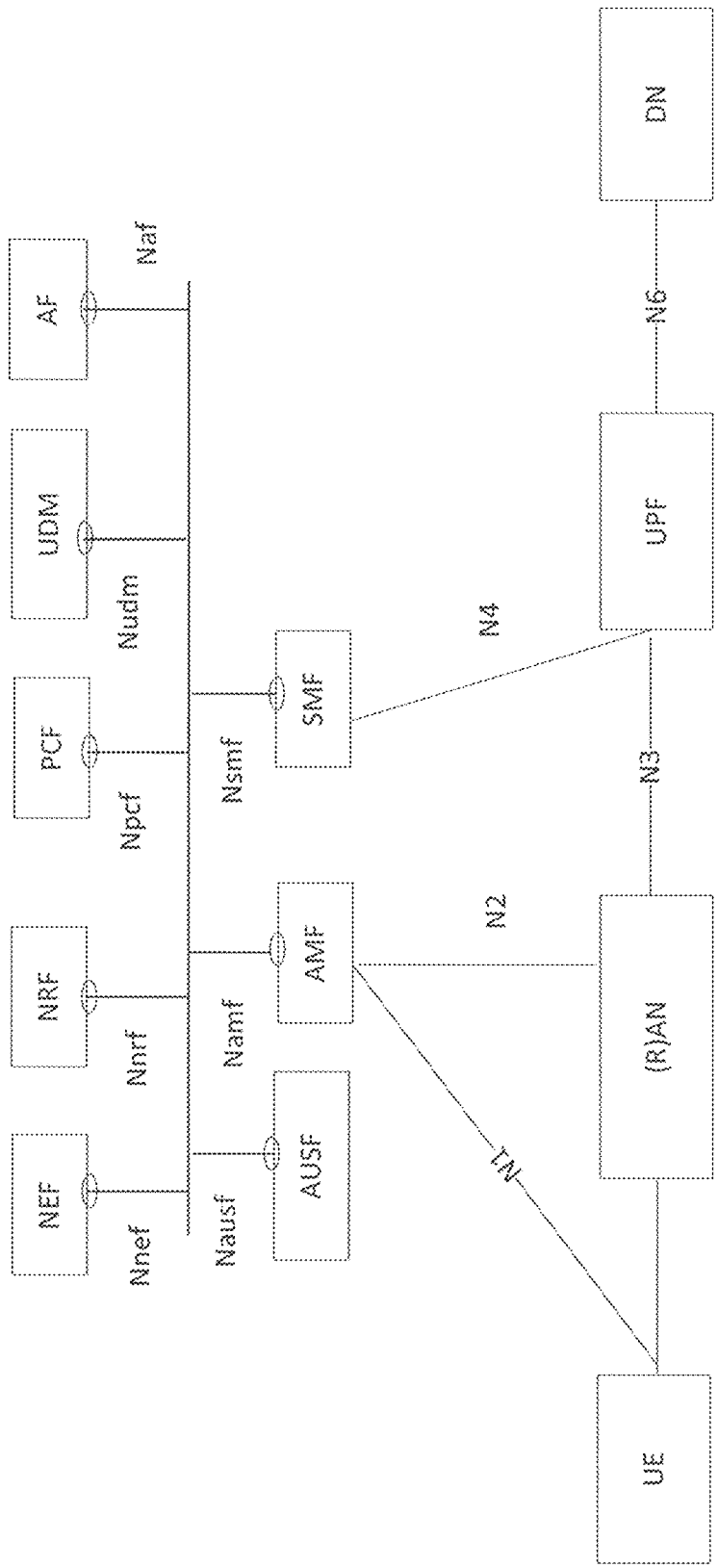
FIG. 2 is a block diagram illustrating a 5G system service-based architecture.

FIG. 2 shows the non-roaming reference architecture with service-based interfaces within the Control Plane.

Figure 3:
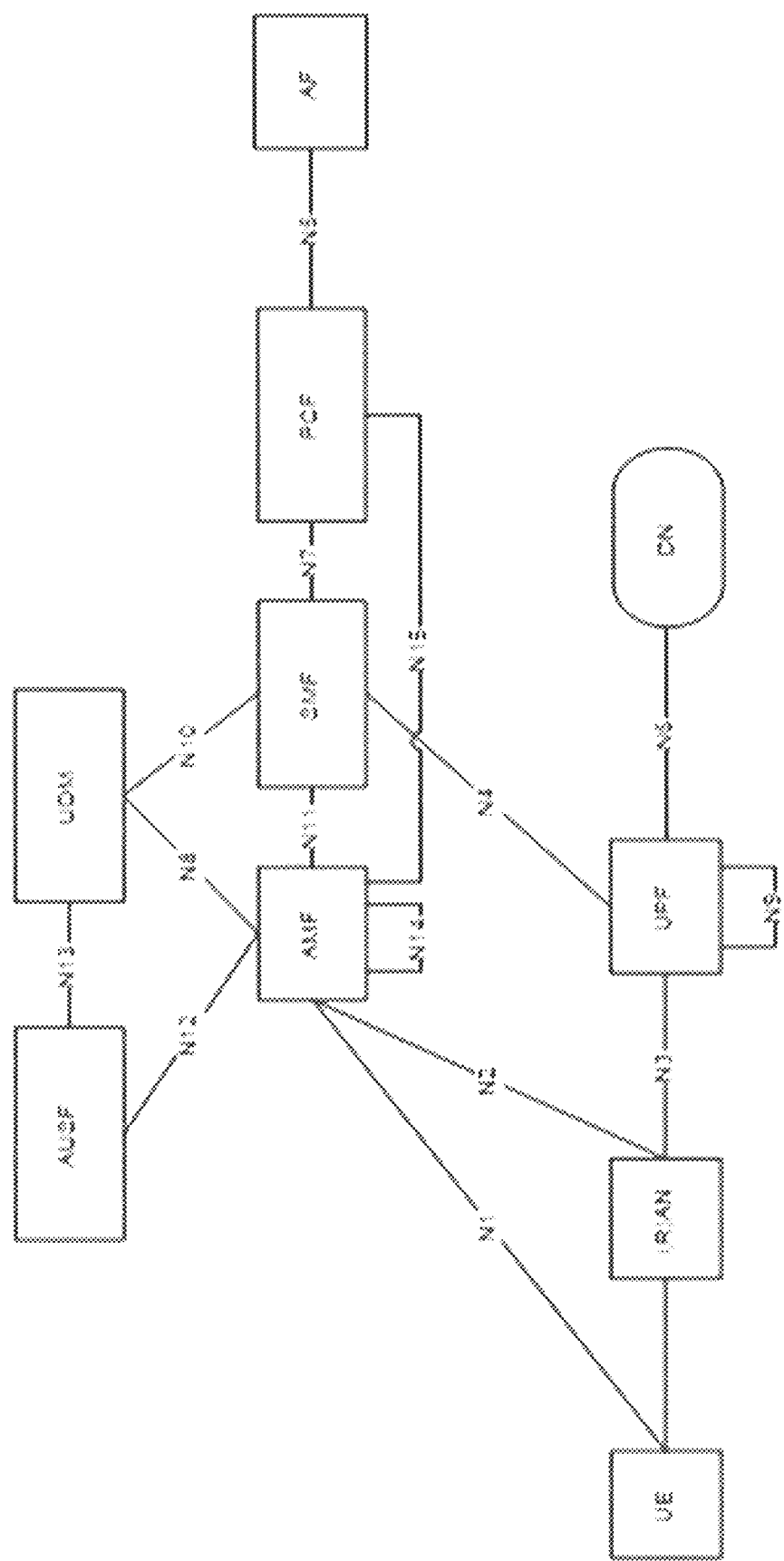
FIG. 3 is a block diagram illustrating a non-roaming 5G system architecture in reference point representation.

FIG. 3 depicts the 5G System architecture in the non-roaming case, using the reference point representation showing how various network functions interact with each other. Note that the mobility management and session management functions are separated. A single Ni Non Access Stratum (NAS) connection is used for both Registration Management and Connection Management (RM/CM) and for Session Management (SM)-related messages and procedures for a UE. The single N1 termination point is located in Access and Mobility Management Function (AMF). The AMF forwards SM related NAS information to the Session Management Function (SMF). AMF handles the RM/CM part of NAS signaling exchanged with the UE. SMF handles the Session Management part of NAS signaling exchanged with the UE.

In the 5G network architecture currently under development by 3GPP, Network Data Analytics (NWDA) is defined as a network function to represent operator managed network analytics. NWDA provides network slice specific network data analytics to the Policy Control Function (PCF). The subscription to NWDA by PCF is on a network slice level and the NWDA is not required to be aware of the current subscribers using the slice. NWDA notifies/publishes slice specific network status analytic information to the PCF(s) that are subscribed to it. This information is not subscriber specific. PCF uses that data in its policy decisions.

Figure 4:
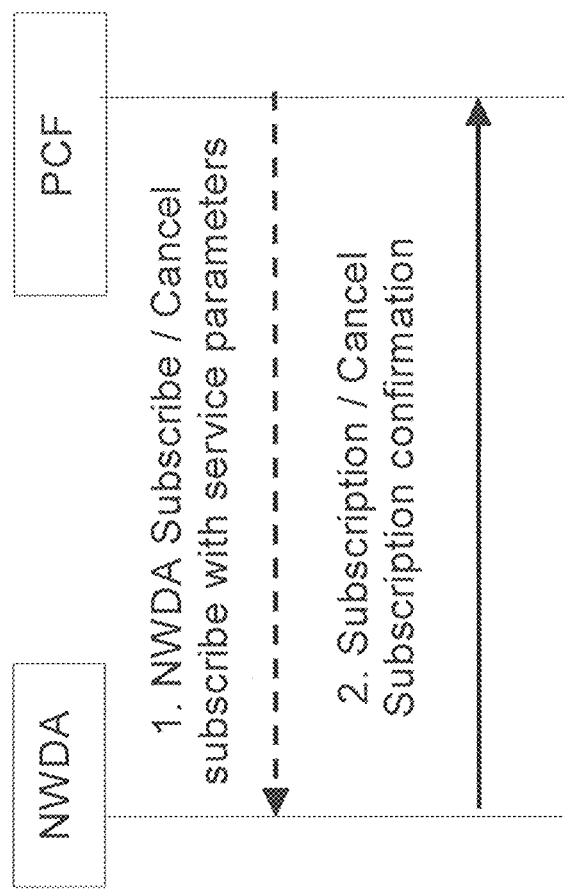
FIG. 4 illustrates a UE triggered service request procedure.
Figure 5:
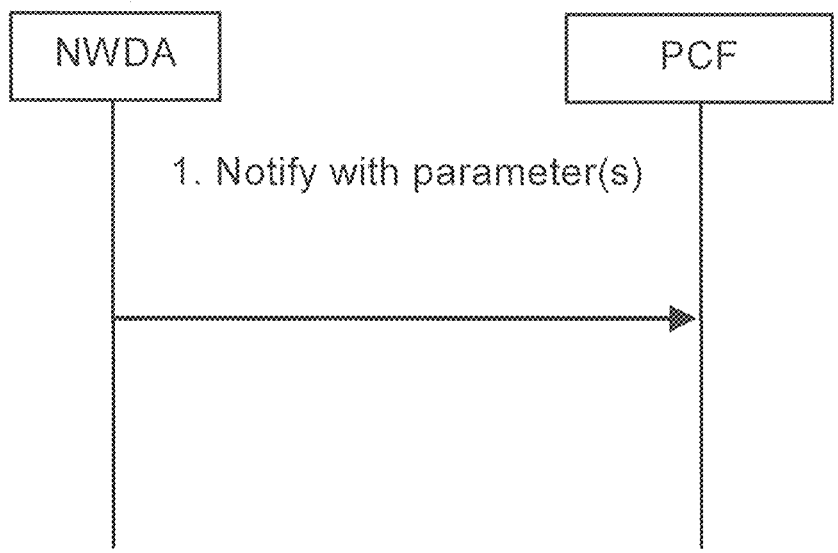
FIG. 5 illustrates an Nnwda notification service.
Figure 6:
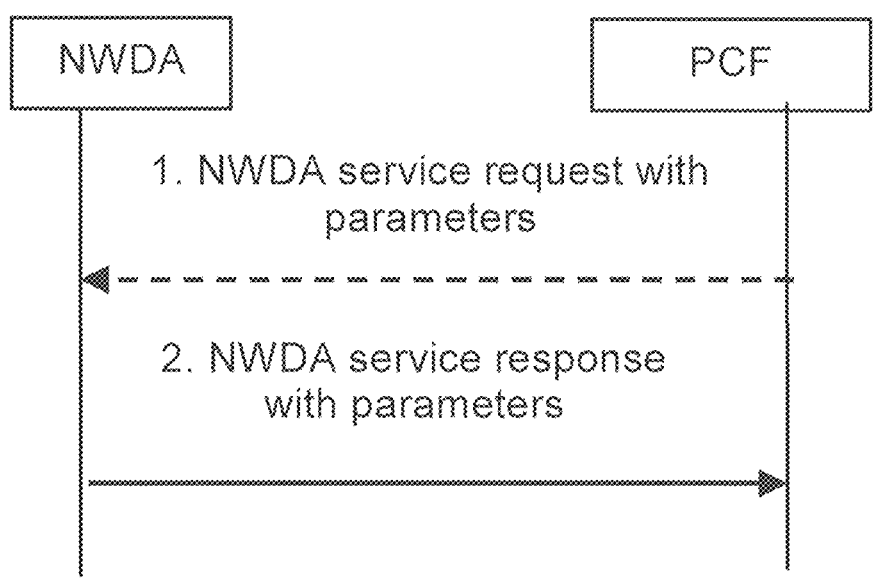
FIG. 6 illustrates an NWDA request/response flow.

An Nnwda reference point resides between the Network Data Analytics (NWDA) and the PCF. In one implementation, the PCF could get analytics data from NWDA by either a request/response model or a subscription/notification model. FIGS. 4 to 6 show these message flows. FIG. 4 illustrates an NWDA subscription service. FIG. 5 illustrates an Nnwda notification service, and FIG. 6 illustrates an NWDA request/response flow.

Figure 7:
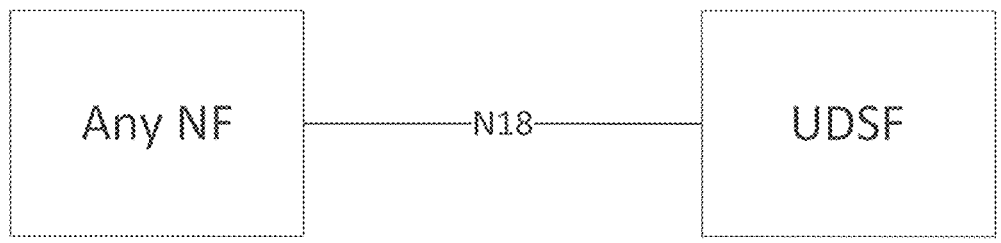
FIG. 7 illustrates a data storage architecture for unstructured data from any NF.

Also in the 5G network architecture currently under development by 3GPP, two types of data storage network functions (DSF) have been defined: (1) a structured DSF, and (2) an unstructured DSF. As shown in FIG. 7, the 5G system architecture allows any network function to store and retrieve its unstructured data into/from a UDSF. The UDSF belongs to the same Public Land Mobile Network (PLMN) where the network function is located. Control plane network functions (NFs) may share a UDSF for storing their respective unstructured data or may each have their own UDSF (e.g. a UDSF may be located close to the respective network function). The UDSF is an optional function that supports Storage and retrieval of information as unstructured data by any network function.

Figure 8:
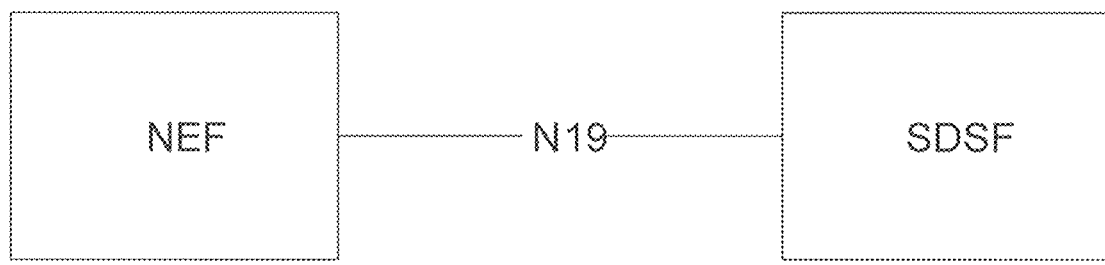
FIG. 8 illustrates a data storage architecture for structured data from the NEF.

As shown in FIG. 8, the 5G system architecture allows the Network Exposure Function (NEF) to store structured data in the SDSF intended for external and internal network exposure by the NEF. SDSF belongs to the same PLMN where the NEF is located. The SDSF is an optional function that supports storage and retrieval of information as structured data by the NEF.

3GPP has identified a variety of use cases that New Radio (NR) is expected to support, resulting in a wide variety of user experience requirements for data rate, latency, and mobility. The use cases include the following general categories: enhanced mobile broadband (e.g., broadband access in dense areas, indoor ultra-high broadband access, broadband access in a crowd, 50+ Mbps everywhere, ultra-low cost broadband access, mobile broadband in vehicles), critical communications, massive machine type communications, network operation (e.g., network slicing, routing, migration and interworking, energy savings), and enhanced vehicle-to-everything (eV2X) communications. Specific service and applications in these categories include, e.g., monitoring and sensor networks, device remote controlling, bi-directional remote controlling, personal cloud computing, video streaming, wireless cloud-based office, first responder connectivity, automotive ecall, disaster alerts, real-time gaming, multi-person video calls, autonomous driving, augmented reality, tactile Internet, and virtual reality to name a few. All of these use cases and others are contemplated herein.

Figure 9:
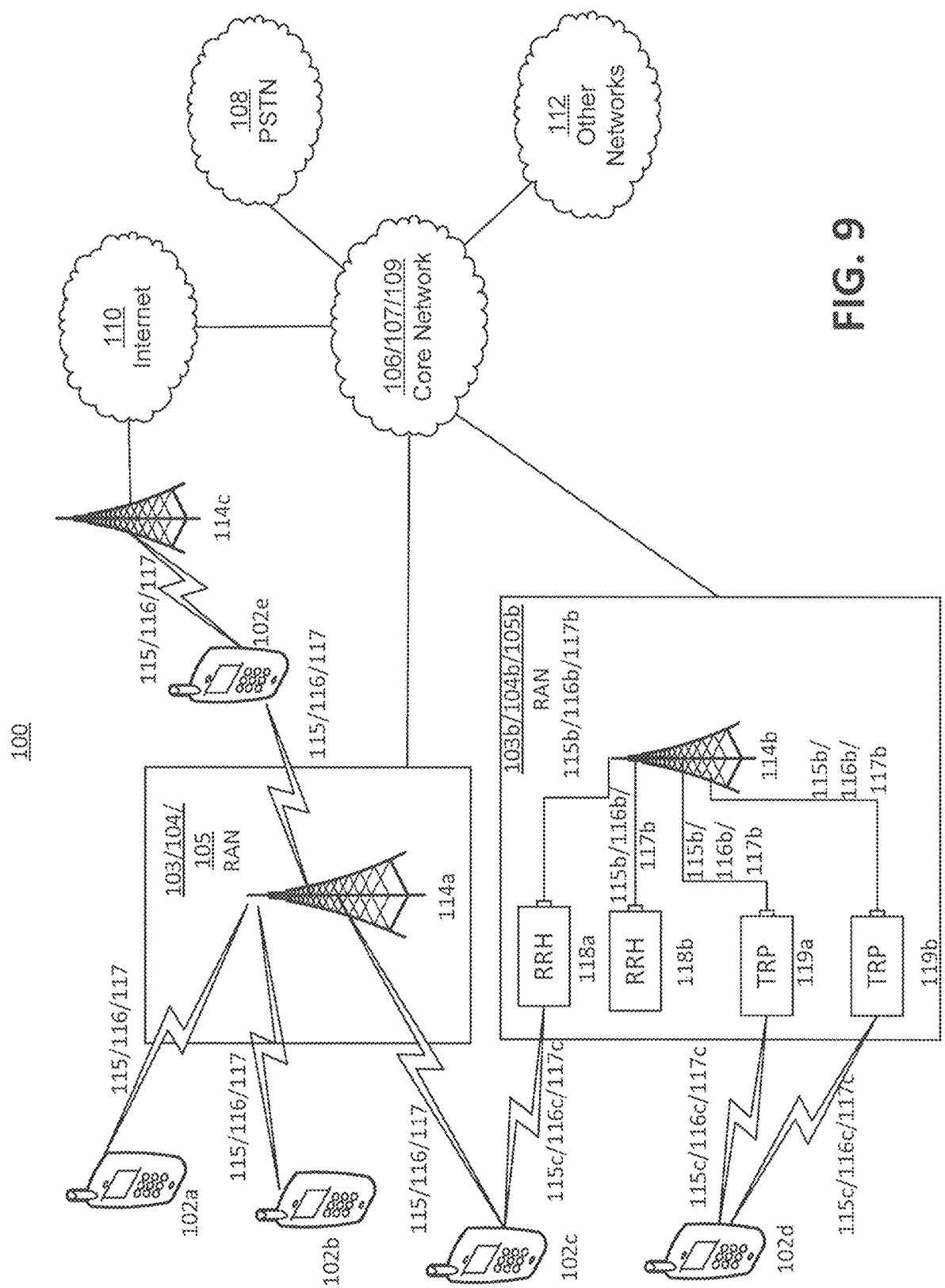
FIG. 9 illustrates an example communications system.

FIG. 9 illustrates one embodiment of an example communications system 100 in which the methods and apparatuses described and claimed herein may be embodied. As shown, the example communications system 100 may include wireless transmit/receive units (WTRUs) 102a, 102b, 102c, and/or 102d (which generally or collectively may be referred to as WTRU 102), a radio access network (RAN) 103/104/105/103b/104b/105b, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d, 102e may be any type of apparatus or device configured to operate and/or communicate in a wireless environment. Although each WTRU 102a, 102b, 102c, 102d, 102e is depicted in FIGS. 9-14 as a hand-held wireless communications apparatus, it is understood that with the wide variety of use cases contemplated for 5G wireless communications, each WTRU may comprise or be embodied in any type of apparatus or device configured to transmit and/or receive wireless signals, including, by way of example only, user equipment (UE), a mobile station, a fixed or mobile subscriber unit, a pager, a cellular telephone, a personal digital assistant (PDA), a smartphone, a laptop, a tablet, a netbook, a notebook computer, a personal computer, a wireless sensor, consumer electronics, a wearable device such as a smart watch or smart clothing, a medical or eHealth device, a robot, industrial equipment, a drone, a vehicle such as a car, truck, train, or airplane, and the like.

The communications system 100 may also include a base station 114a and a base station 114b. Base stations 114a may be any type of device configured to wirelessly interface with at least one of the WTRUs 102a, 102b, 102c to facilitate access to one or more communication networks, such as the core network 106/107/109, the Internet 110, and/or the other networks 112. Base stations 114b may be any type of device configured to wiredly and/or wirelessly interface with at least one of the RRHs (Remote Radio Heads) 118a, 118b and/or TRPs (Transmission and Reception Points) 119a, 119b to facilitate access to one or more communication networks, such as the core network 106/107/109, the Internet 110, and/or the other networks 112. RRHs 118a, 118b may be any type of device configured to wirelessly interface with at least one of the WTRU 102c, to facilitate access to one or more communication networks, such as the core network 106/107/109, the Internet 110, and/or the other networks 112. TRPs 119a, 119b may be any type of device configured to wirelessly interface with at least one of the WTRU 102d, to facilitate access to one or more communication networks, such as the core network 106/107/109, the Internet 110, and/or the other networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/ 105, which may also include other base stations and/or network elements (not shown), such as a base station controller (BSC), a radio network controller (RNC), relay nodes, etc. The base station 114b may be part of the RAN 103b/104b/105b, which may also include other base stations and/or network elements (not shown), such as a base station controller (BSC), a radio network controller (RNC), relay nodes, etc. The base station 114a may be configured to transmit and/or receive wireless signals within a particular geographic region, which may be referred to as a cell (not shown). The base station 114b may be configured to transmit and/or receive wired and/or wireless signals within a particular geographic region, which may be referred to as a cell (not shown). The cell may further be divided into cell sectors. For example, the cell associated with the base station 114a may be divided into three sectors. Thus, in an embodiment, the base station 114a may include three transceivers, e.g., one for each sector of the cell. In an embodiment, the base station 114a may employ multiple-input multiple output (MIMO) technology and, therefore, may utilize multiple transceivers for each sector of the cell.

The base stations 114a may communicate with one or more of the WTRUs 102a, 102b, 102c over an air interface 115/116/117, which may be any suitable wireless communication link (e.g., radio frequency (RF), microwave, infrared (IR), ultraviolet (UV), visible light, cmWave, mmWave, etc.). The air interface 115/116/117 may be established using any suitable radio access technology (RAT).

The base stations 114b may communicate with one or more of the RRHs 118a, 118b and/or TRPs 119a, 119b over a wired or air interface 115b/116b/117b, which may be any suitable wired (e.g., cable, optical fiber, etc.) or wireless communication link (e.g., radio frequency (RF), microwave, infrared (IR), ultraviolet (UV), visible light, cmWave, mmWave, etc.). The air interface 115b/116b/117b may be established using any suitable radio access technology (RAT).

The RRHs 118a, 118b and/or TRPs 119a, 119b may communicate with one or more of the WTRUs 102c, 102d over an air interface 115c/116c/117c, which may be any suitable wireless communication link (e.g., radio frequency (RF), microwave, infrared (IR), ultraviolet (UV), visible light, cmWave, mmWave, etc.). The air interface 115c/116c/117c may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c, or RRHs 118a, 118b and TRPs 119a, 119b in the RAN 103b/104b/105b and the WTRUs 102c, 102d, may implement a radio technology such as Universal Mobile Telecommunications System (UMTS) Terrestrial Radio Access (UTRA), which may establish the air interface 115/116/117 or 115c/116c/117c respectively using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 114a and the WTRUs 102a, 102b, 102c, or RRHs 118a, 118b and TRPs 119a, 119b in the RAN 103b/104b/105b and the WTRUs 102c, 102d, may implement a radio technology such as Evolved UMTS Terrestrial Radio Access (E-UTRA), which may establish the air interface 115/116/117 or 115c/116c/117c respectively using Long Term Evolution (LTE) and/or LTE-Advanced (LTE-A). In the future, the air interface 115/116/117 may implement 3GPP NR technology.

In an embodiment, the base station 114a in the RAN 103/104/105 and the WTRUs 102a, 102b, 102c, or RRHs 118a, 118b and TRPs 119a, 119b in the RAN 103b/104b/105b and the WTRUs 102c, 102d, may implement radio technologies such as IEEE 802.16 (e.g., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114c in FIG. 9 may be a wireless router, Home Node B, Home eNode B, or access point, for example, and may utilize any suitable RAT for facilitating wireless connectivity in a localized area, such as a place of business, a home, a vehicle, a campus, and the like. In an embodiment, the base station 114c and the WTRUs 102e, may implement a radio technology such as IEEE 802.11 to establish a wireless local area network (WLAN). In an embodiment, the base station 114c and the WTRUs 102d, may implement a radio technology such as IEEE 802.15 to establish a wireless personal area network (WPAN). In yet another embodiment, the base station 114c and the WTRUs 102e, may utilize a cellular-based RAT (e.g., WCDMA, CDMA2000, GSM, LTE, LTE-A, etc.) to establish a picocell or femtocell. As shown in FIG. 9, the base station 114b may have a direct connection to the Internet 110. Thus, the base station 114c may not be required to access the Internet 110 via the core network 106/107/109.

The RAN 103/104/105 and/or RAN 103b/104b/105b may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication.

Although not shown in FIG. 9, it will be appreciated that the RAN 103/104/105 and/or RAN 103b/104b/105b and/or the core network 106/107/109 may be in direct or indirect communication with other RANs that employ the same RAT as the RAN 103/104/105 and/or RAN 103b/104b/105b or a different RAT. For example, in addition to being connected to the RAN 103/104/105 and/or RAN 103b/104b/105b, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d, 102e to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (LTDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 and/or RAN 103b/104b/105b or a different RAT.

Some or all of the WTRUs 102a, 102b, 102c, 102d in the communications system 100 may include multi-mode capabilities, e.g., the WTRUs 102a, 102b, 102c, 102d, and 102e may include multiple transceivers for communicating with different wireless networks over different wireless links. For example, the WTRU 102e shown in FIG. 9 may be configured to communicate with the base station 114a, which may employ a cellular-based radio technology, and with the base station 114c, which may employ an IEEE 802 radio technology.

Figure 10:
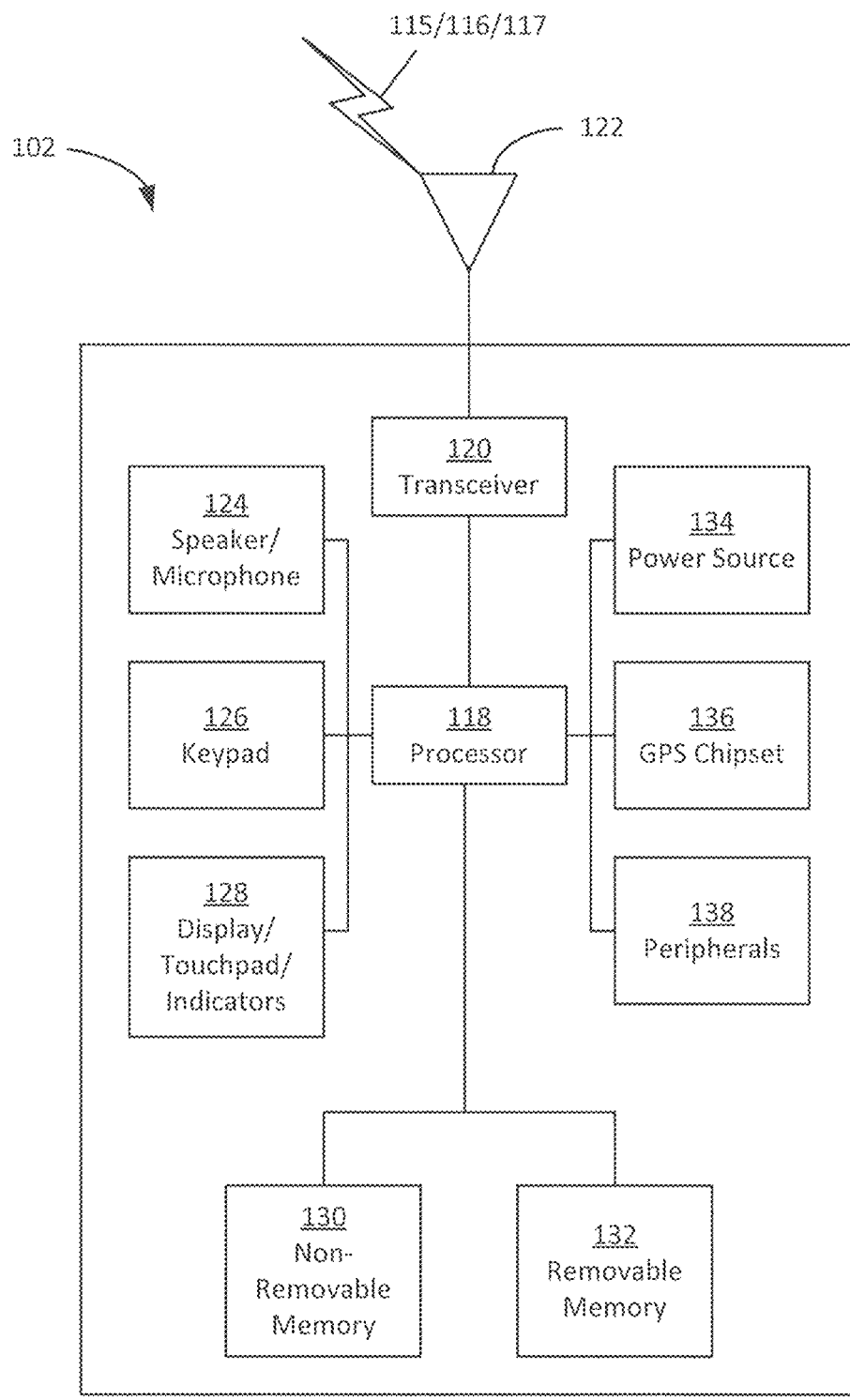
FIG. 10 is a block diagram of an example apparatus or device configured for wireless communications such as, for example, a wireless transmit/receive unit (WTRU)

FIG. 10 is a block diagram of an example apparatus or device configured for wireless communications in accordance with the embodiments illustrated herein, such as for example, a WTRU 102. As shown in FIG. 10, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 10 and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 10 depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in an embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet an embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 10 as a single element, the WTRU 102 may include any number of transmit/receive elements 122. More specifically, the WTRU 102 may employ MIMO technology. Thus, in an embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATS, such as UTRA and IEEE 802.11, for example.

The processor 118 of the WTRU 102 may be coupled to, and may receive user input data from, the speaker/microphone 124, the keypad 126, and/or the display/touchpad/indicators 128 (e.g., a liquid crystal display (LCD) display unit or organic light-emitting diode (OLED) display unit). The processor 118 may also output user data to the speaker/microphone 124, the keypad 126, and/or the display/touchpad/indicators 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In an embodiment, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries, solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include various sensors such as an accelerometer, biometrics (e.g., finger print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The WTRU 102 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The WTRU 102 may connect to other components, modules, or systems of such apparatuses or devices via one or more interconnect interfaces, such as an interconnect interface that may comprise one of the peripherals 138.

Figure 11:
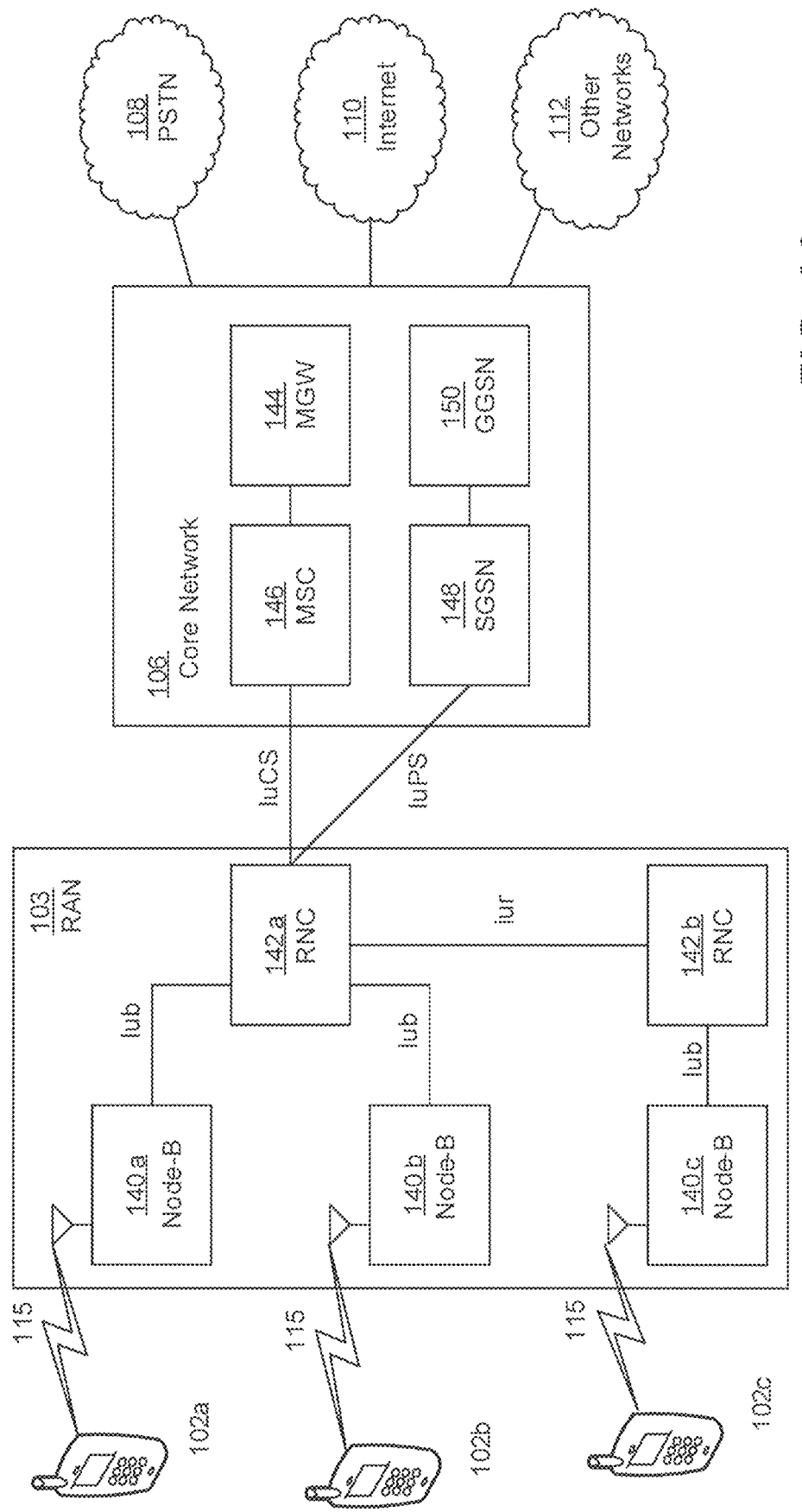
FIG. 11 is a system diagram of a first example radio access network (RAN) and core network.

FIG. 11 is a system diagram of the RAN 103 and the core network 106 according to an embodiment. As noted above, the RAN 103 may employ a UTRA radio technology to communicate with the WTRUs 102a, 102b, and 102c over the air interface 115. The RAN 103 may also be in communication with the core network 106. As shown in FIG. 11, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 11, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macro-diversity, security functions, data encryption, and the like.

The core network 106 shown in FIG. 11 may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 12:
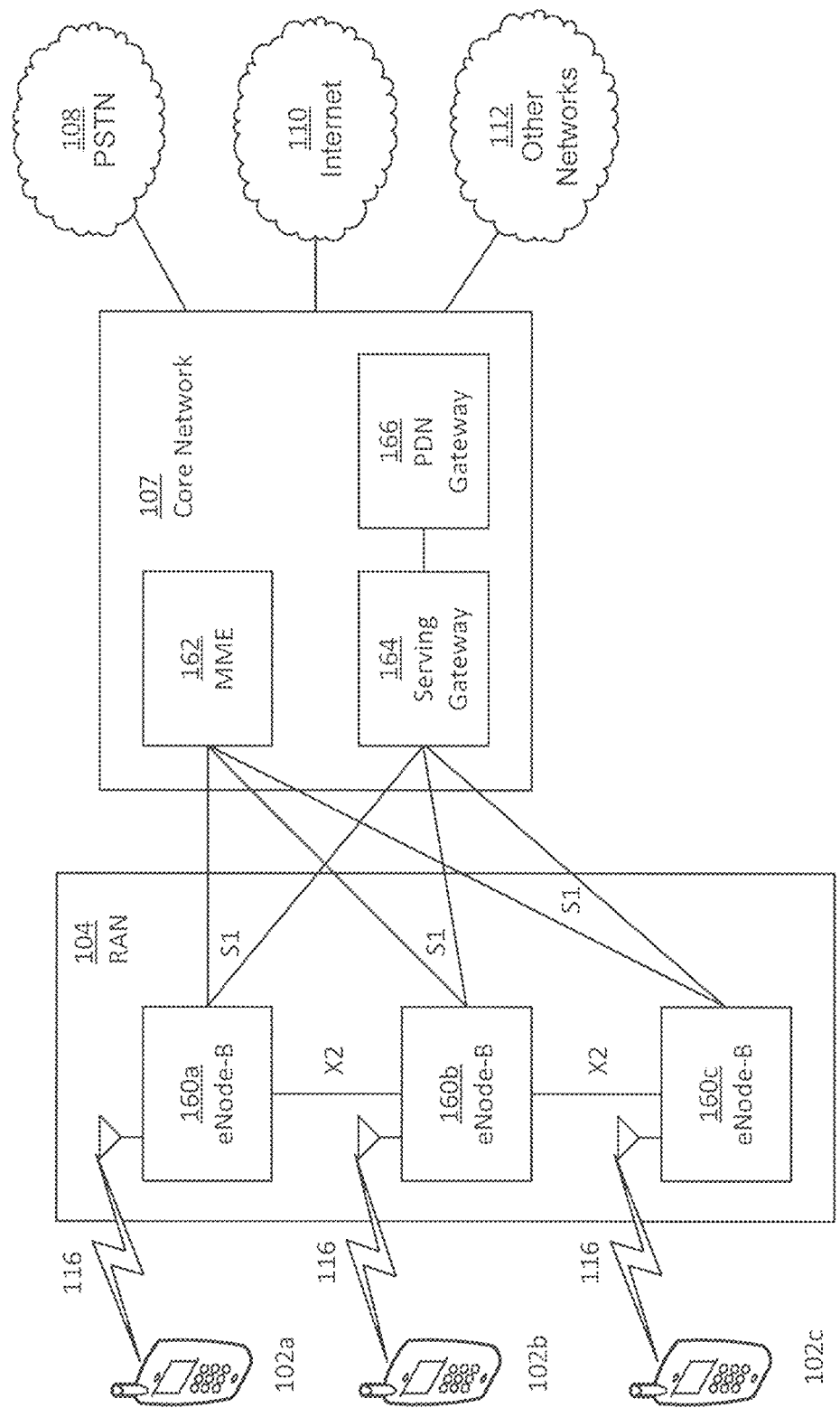
FIG. 12 is a system diagram of a second example RAN.

FIG. 12 is a system diagram of the RAN 104 and the core network 107 according to an embodiment. As noted above, the RAN 104 may employ an E-UTRA radio technology to communicate with the WTRUs 102a, 102b, and 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In an embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink and/or downlink, and the like. As shown in FIG. 12, the eNode-Bs 160a, 160b, 160c may communicate with one another over an X2 interface.

The core network 107 shown in FIG. 12 may include a mobility management gateway (MIME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, and 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MIME 162 may also provide a control plane function for switching between the RAN 104 and other RANs (not shown) that employ other radio technologies, such as GSM or WCDMA.

The serving gateway 164 may be connected to each of the eNode-Bs 160a, 160b, and 160c in the RAN 104 via the Si interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 13:
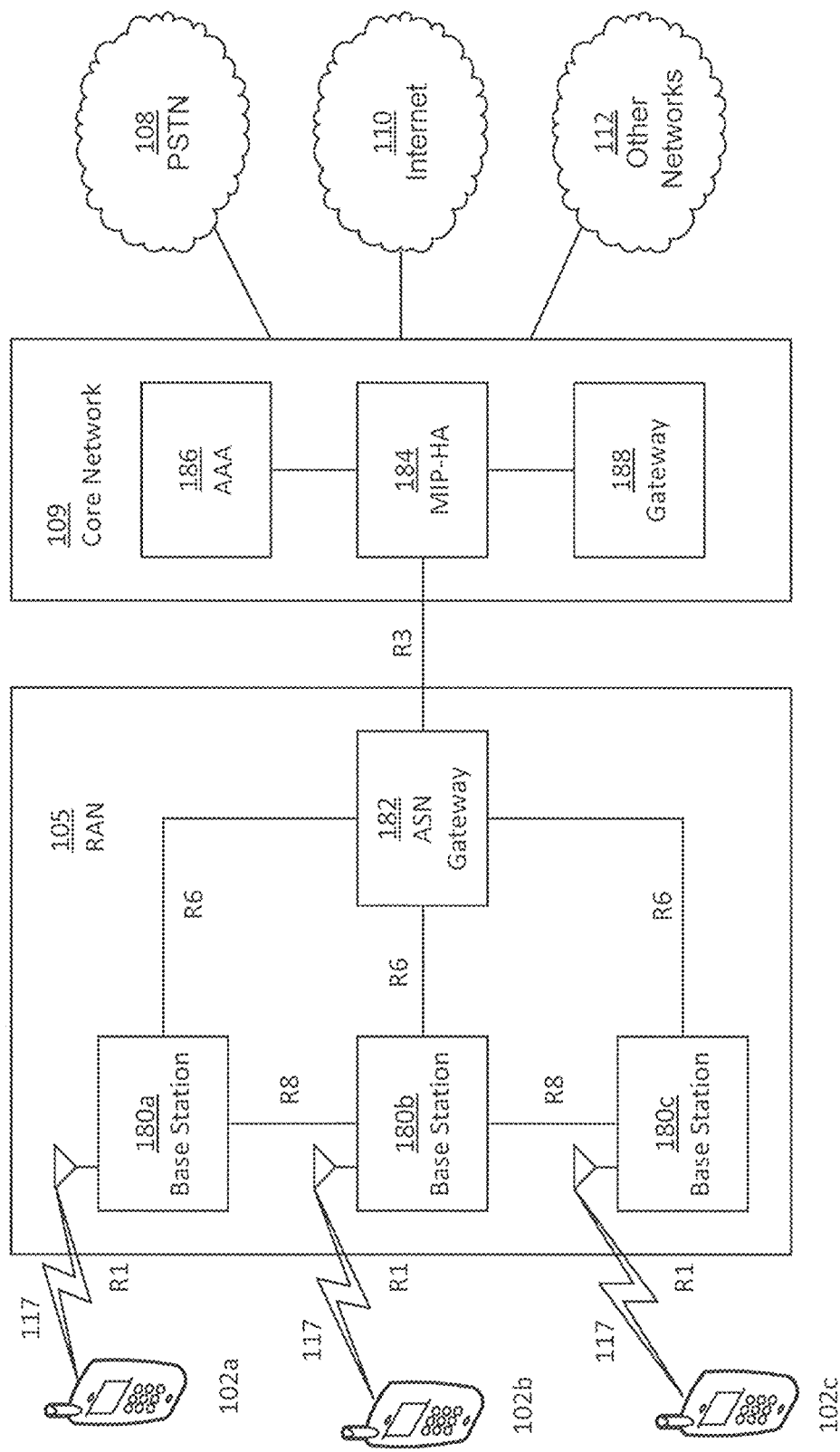
FIG. 13 is a system diagram of a third example radio access network RAN.

FIG. 13 is a system diagram of the RAN 105 and the core network 109 according to an embodiment. The RAN 105 may be an access service network (ASN) that employs IEEE 802.16 radio technology to communicate with the WTRUs 102a, 102b, and 102c over the air interface 117. As will be further discussed below, the communication links between the different functional entities of the WTRUs 102a, 102b, 102c, the RAN 105, and the core network 109 may be defined as reference points.

As shown in FIG. 13, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell in the RAN 105 and may include one or more transceivers for communicating with the WTRUs 102a, 102b, 102c over the air interface 117. In an embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, and 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180*a*, 180*b*, and 180*c* may be defined as an R8 reference point that includes protocols for facilitating WTRU handovers and the transfer of data between base stations. The communication link between the base stations 180*a*, 180*b*, 180*c* and the ASN gateway 182 may be defined as an R6 reference point. The R6 reference point may include protocols for facilitating mobility management based on mobility events associated with each of the WTRUs 102*a*, 102*b*, 102*c*.

As shown in FIG. 13, the RAN 105 may be connected to the core network 109. The communication link between the RAN 105 and the core network 109 may be defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102*a*, 102*b*, and 102*c* to roam between different ASNs and/or different core networks. The MIP-HA 184 may provide the WTRUs 102*a*, 102*b*, 102*c* with access to packet-switched networks, such as the Internet 110, to facilitate communications between the WTRUs 102*a*, 102*b*, 102*c* and IP-enabled devices. The AAA server 186 may be responsible for user authentication and for supporting user services. The gateway 188 may facilitate interworking with other networks. For example, the gateway 188 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. In addition, the gateway 188 may provide the WTRUs 102*a*, 102*b*, 102*c* with access to the networks 112, which may include other wired or wireless networks that are owned and/or operated by other service providers.

Although not shown in FIG. 13, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102*a*, 102*b*, 102*c* between the RAN 105 and the other ASNs. The communication link between the core network 109 and the other core networks may be defined as an R5 reference, which may include protocols for facilitating interworking between home core networks and visited core networks.

The core network entities described herein and illustrated in FIGS. 9-14 are identified by the names given to those entities in certain existing 3GPP specifications, but it is understood that in the future those entities and functionalities may be identified by other names and certain entities or functions may be combined in future specifications published by 3GPP, including future 3GPP NR specifications. Thus, the particular network entities and functionalities described and illustrated in FIGS. 9-14 are provided by way of example only, and it is understood that the subject matter disclosed and claimed herein may be embodied or implemented in any similar communication system, whether presently defined or defined in the future.

Figure 14:
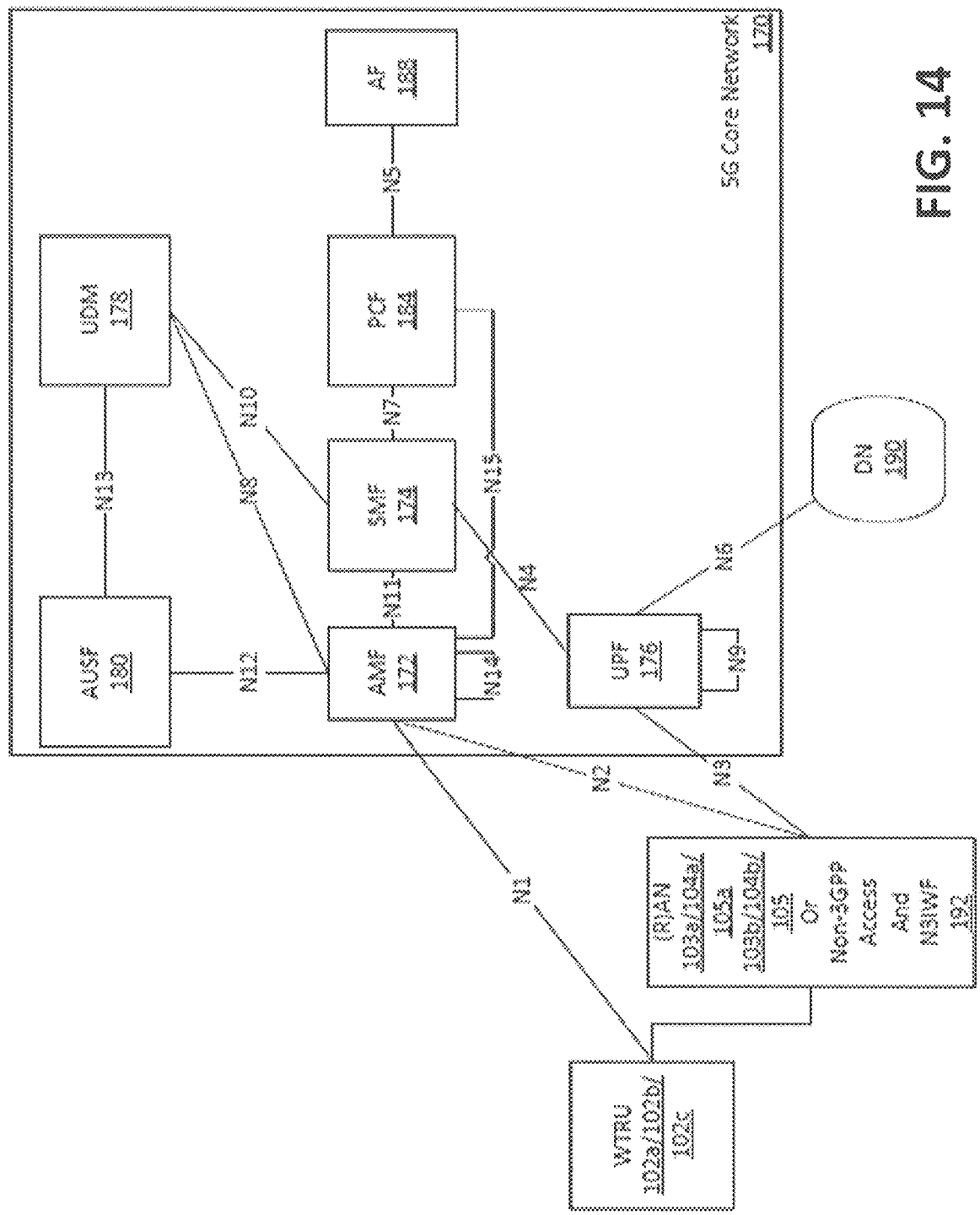
FIG. 14 is a system diagram of a fourth example radio access network RAN.

The 5G core network 170 shown in FIG. 14 may include an access and mobility management function (AMF) 172, a session management function (SMF) 174, a user plane function (UPF) 176, a user data management function (UDM) 178, an authentication server function (AU SF) 180, a Network Exposure Function (NEF), a policy control function (PCF) 184, a non-3GPP interworking function (N3IWF) 192 and an application function (AF) 188. While each of the foregoing elements are depicted as part of the 5G core network 170, it will be appreciated that any one of these elements may be owned and/or operated by an entity other than the core network operator. It should also be appreciated that a 5G core network may not consist of all of these elements, may consist of additional elements, and may consist of multiple instances of each of these elements. FIG. 14 shows that network functions directly connect to one another, however, it should be appreciated that they may communicate via routing agents such as diameter routing agents or message buses.

The AMF 172 may be connected to each of the RAN 103/104/105/103*b*/104*b*/105*b* via an N2 interface and may serve as a control node. For example, the AMF 172 may be responsible for registration management, connection management, reachability management, access authentication, access authorization. The AMF 172 may generally route and forward NAS packets to/from the WTRUs 102*a*, 102*b*, 102*c*.

The SMF 174 may be connected to the AMF 172 via an N11 interface, may be connected to a PCF 184 via an N7 interface, and may be connected to the UPF 176 via an N4 interface. The SMF 174 may serve as a control node. For example, the SMF 174 may be responsible for Session Management, WTRUs 102*a*, 102*b*, 102*c* IP address allocation & management and configuration of traffic steering rules in the UPF 176, and generation of downlink data notifications.

The SMF 174 may also be connected to the UPF 176, which may provide the WTRUs 102*a*, 102*b*, 102*c* with access to a data network (DN) 190, such as the Internet 110, to facilitate communications between the WTRUs 102*a*, 102*b*, 102*c* and IP-enabled devices. The SMF 174 may manage and configure traffic steering rules in the UPF 176 via the N4 interface. The UPF 176 may be responsible for interconnecting a packet data unit (PDU) session with a data network, packet routing and forwarding, policy rule enforcement, quality of service handling for user plane traffic, and downlink packet buffering.

The AMF 172 may also be connected to the N3IWF 192 via an N2 interface. The N3IWF facilities a connection between the WTRUs 102*a*, 102*b*, 102*c* and the 5G core network 170 via radio interface technologies that are not defined by 3GPP.

The PCF 184 may be connected to the SMF 174 via an N7 interface, connected to the AMF 172 via an N15 interface, and connected to an application function (AF) 188 via an N5 interface. The PCF 184 may provide policy rules to control plane nodes such as the AMF 172 and SMF 174, allowing the control plane nodes to enforce these rules.

The UDM 178 acts as a repository for authentication credentials and subscription information. The UDM may connect to other functions such as the AMF 172, SMF 174, and AUSF 180.

The AUSF 180 performs authentication related operations and connects to the UDM 178 via an N13 interface and to the AMF 172 via an N12 interface.

The NEF exposes capabilities and services in the 5G core network 170. The NEF may connect to an AF 188 via an interface and it may connect to other control plane and user plane functions (180, 178, 172, 172, 184, 176, and N3IWF) in order to expose the capabilities and services of the 5G core network 170.

The 5G core network 170 may facilitate communications with other networks. For example, the core network 170 may include, or may communicate with, an IP gateway (e.g., an IP multimedia subsystem (IMS) server) that serves as an interface between the 5G core network 170 and the PSTN 108. For example, the core network 170 may include, or communicate with a short message service (SMS) service center that facilities communication via the short message service. For example, the 5G core network 170 may facilitate the exchange of non-IP data packets between the WTRUs 102a, 102b, 102c and servers. In addition, the core network 170 may provide the WTRUs 102a, 102b, 102c with access to the networks 112, which may include other wired or wireless networks that are owned and/or operated by other service providers.

Figure 15:
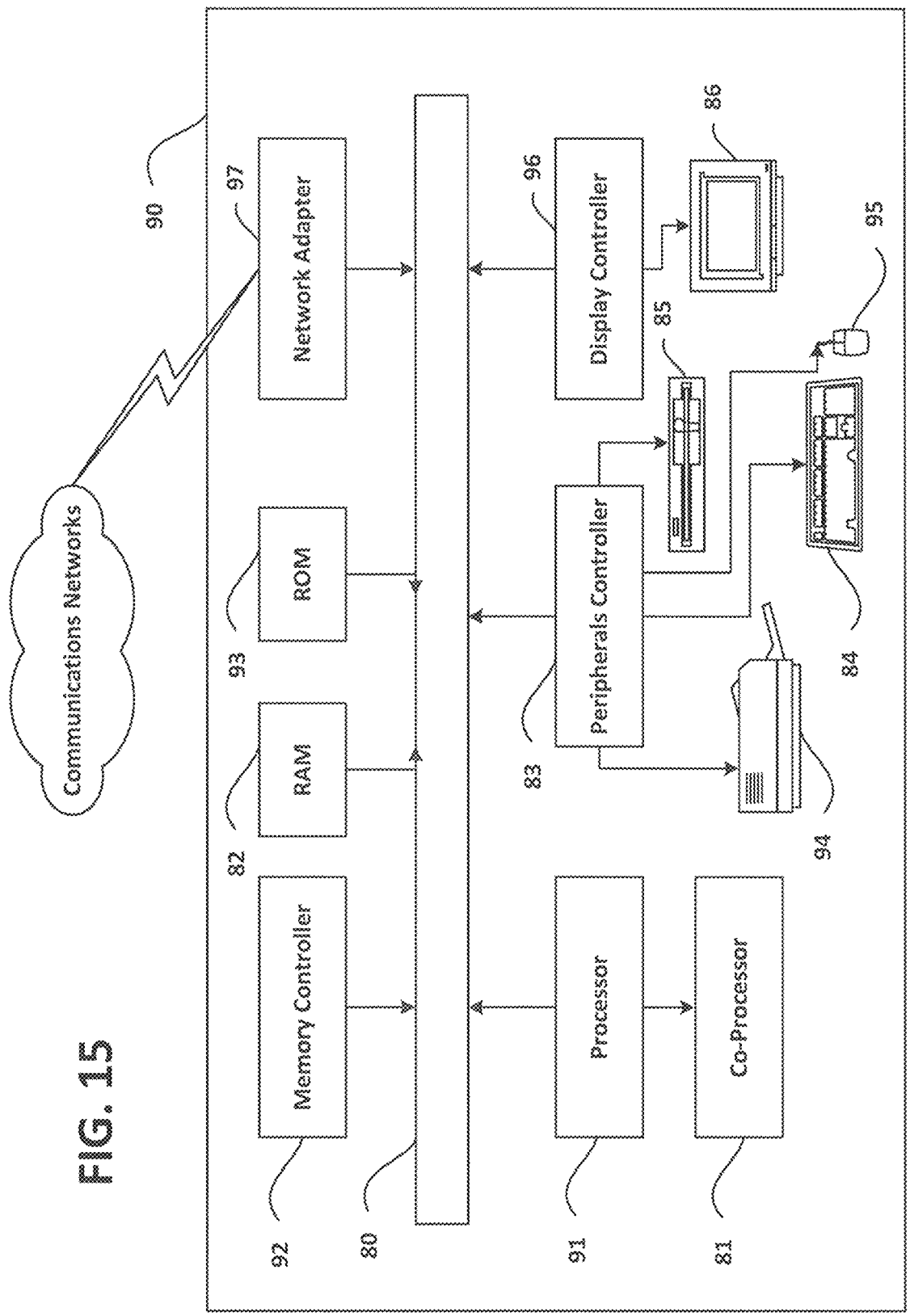
FIG. 15 is a block diagram of an example computing system in which a node of a communication system may be embodied.

FIG. 15 is a block diagram of an exemplary computing system 90 in which one or more apparatuses of the communications networks illustrated or described herein may be embodied, such as certain nodes or functional entities in the RAN 103/104/105, Core Network 106/107/109, PSTN 108, Internet 110, or Other Networks 112.

Computing system 90 may comprise a computer or server and may be controlled primarily by computer readable instructions, which may be in the form of software, wherever, or by whatever means such software is stored or accessed. Such computer readable instructions may be executed within a processor 91, to cause computing system 90 to do work. The processor 91 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 91 may perform signal coding, data processing, power control, input/output processing, and/or any other functionality that enables the computing system 90 to operate in a communications network. Coprocessor 81 is an optional processor, distinct from main processor 91, that may perform additional functions or assist processor 91. Processor 91 and/or coprocessor 81 may receive, generate, and process data related to the methods and apparatuses disclosed herein.

In operation, processor 91 fetches, decodes, and executes instructions, and transfers information to and from other resources via the computing system's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by processor 91 or other hardware devices. Access to RANI 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from processor 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. The visual output may be provided in the form of a graphical user interface (GUI). Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a network adapter 97, that may be used to connect computing system 90 to an external communications network, such as the RAN 103/104/105, Core Network 106/107/109, PSTN 108, Internet 110, or Other Networks 112 of FIGS. 9-14, to enable the computing system 90 to communicate with other nodes or functional entities of those networks. The communication circuitry, alone or in combination with the processor 91, may be used to perform the transmitting and receiving steps of certain apparatuses, nodes, or functional entities described herein.

It is understood that any or all of the apparatuses, systems, methods and processes described herein may be embodied in the form of computer executable instructions (e.g., program code) stored on a computer-readable storage medium which instructions, when executed by a processor, such as processors 118 or 91, cause the processor to perform and/or implement the systems, methods and processes described herein. Specifically, any of the steps, operations or functions described herein may be implemented in the form of such computer executable instructions, executing on the processor of an apparatus or computing system configured for wireless and/or wired network communications. Computer readable storage media include volatile and nonvolatile, removable and non-removable media implemented in any non-transitory (e.g., tangible or physical) method or technology for storage of information, but such computer readable storage media do not includes signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which can be used to store the desired information and which can be accessed by a computing system.

In one example scenario that may be helpful in illustrating the methods and apparatus described herein, an M2M service provider may place multiple sensors and cameras inside a manufacturing factory. Some sensors and cameras could be used for monitoring the real-time manufacturing activities in the factory, and other sensors could be used to perform measurements based on requests from an M2M server.

With a network data analytics (NWDA) function provisioned by a 5G core network, the M2M server (i.e., SCS/AS)

may provide some information, so that the NWDA is able to provide more accurate and richer information to the PCF and other network functions. For example, the M2M server may inform the NWDA that all the sensors within the factory will only send infrequent small data, and that this data is only mobile originated (i.e., uplink link) from the sensors to the M2M server. The downlink data will be only group based. In other words, M2M server is always broadcasting the mobile terminated data to a group of sensors. More specifically, M2M server may even provide some parameters in this case, such as the estimated frequency of the mobile originated small data as well as the group size for the mobile terminated group communication. Combining this information with the network slice congestion level at NWDA can help the network slice assignment and session management process.

As another example, regarding the applications of using the cameras, the M2M server may inform the NWDA about the required QoS for transferring the video stream, and that mobility support is not required. This information also helps the network slice assignment as well as the mobility management.

In addition, the M2M server may subscribe to some events and statistics at NWDA, so that it will be notified and take corresponding actions when the subscribed events take place. For example, the M2M server may subscribe to events related to the session level congestion of the sensor reporting application. If the session level congestion exceeds a certain threshold over a time period, the NWDA will notify the M2M server, which may start working with some network entities to mitigate the congestion, such as increasing the capacity of existing session or establishing a new session.

As another example, the M2M server may also subscribe to an event triggered when the video data transfer exceeds a certain data rate over a period of time on the application level, e.g., too many cameras send data at the same time. In this case the M2M server may allocate more resources to process video data or to schedule the cameras to stream data at different time intervals.

As another example, the M2M server may subscribe to an event triggered when any UE (e.g., sensor or camera) is in CONNECTED state for a long time without sending/receiving the data. In this case, M2M server may ask a network entity to adjust the sleeping cycle for the UE.

The M2M server may also be interested in the event that a network slice serving the UEs which register with the server becomes overloaded in terms of total number of connections or total amount of traffic. So, the M2M server may request an additional network slice or more network resources within the network slice for better service quality.

As yet another example, the M2M server may be interested in some combination of events, which is only known within the core network, or NWDA. For example, the M2M server may want to know the average uplink data rate of a set of UEs, if these UEs are in a certain geographic area (e.g., a registration area or tracking area), and if any of these UEs are using a UPF that experiences heavy load. The geographic area information may come from AMF, while uplink data rate and UPF load information may come from SMF/UPF. In this case, NWDA is the network entity that knows both information, and thus is able to generate the desired network data analytics for the M2M server.

Currently, the usage of NWDA is limited to provide network status (e.g. congestion level) to the PCF and the PCF will use the information to make policy decisions. However, in order to provide the analytics, it is not clear what information NWDA needs to collect, how it collects this information, and what the analytics information consists of beyond slice specific congestion information. Therefore, it is desired to define what information to collect by the NWDA and what types of analytics NWDA provides. There is also a need to define the mechanisms for information collection.

In addition, the network data analytics could benefit not only the policy related procedures, but also some other important network management processes, such as network function selection, mobility management and session management. In other words, NWDA should be able to interact with some network functions other than PCF to facilitate those procedures. Therefore, new interface and methods are needed to define how the NWDA interacts with other network functions and with the SCS/AS for providing the network data analytics. This is especially important for IoT applications, since there are usually a large number of IoT devices/connections, which may produce a large amount of data records. The network data analytics capability could supply critical statistics to network entities, network operator and service provider for more efficient network operation.

Addressing these and other shortcomings, disclosed hereinafter are new types of network data analytics and mechanisms for a new NWDA framework, which enable a new and improved network data analytics capability in the 5G core network.

Figure 16:
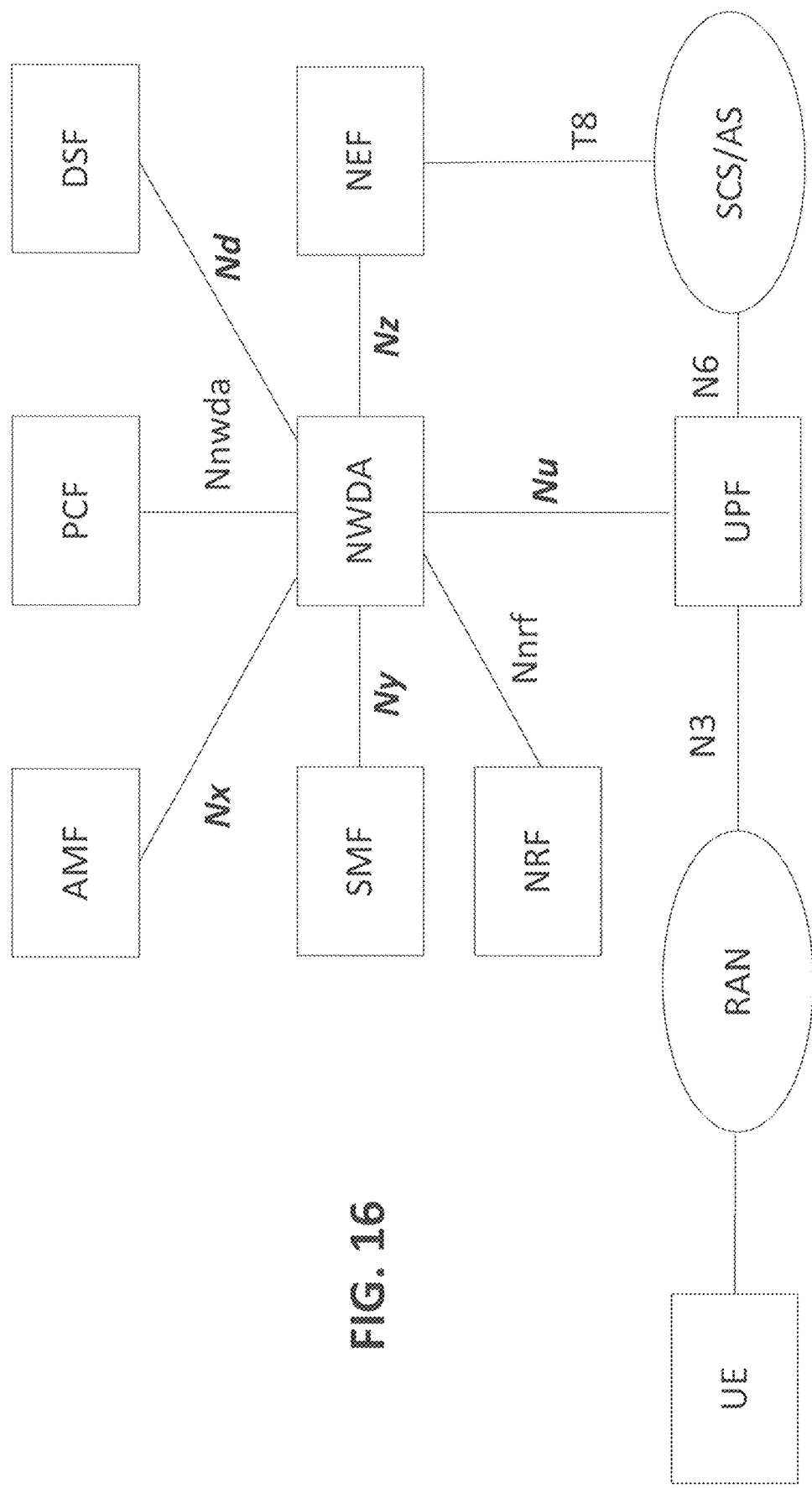
FIG. 16 illustrates an example architecture for network data analytics in a 5G network.

FIG. 16 shows one embodiment of an architecture supporting a network data analytics function. The interfaces between NWDA and AMF (SMF, DSF, NEF and UPF) are defined hereinafter. The NWDA may also be referred to herein as a Network Data Analytics Function (NWDAF).

Methods of Collecting Information for Analytics

Disclosed hereinafter are methods by which the NWDA may collect information to generate network data analytics. The network entities involved may include NFs within the 5G core network and the SCS/AS. NEF may be used as an intermediate node when NWDA pulls some information from SCS/AS or when the SCS/AS obtains information from the NWDA. In one embodiment, the NWDA may retrieve information from different network entities using one of two models: (1) a subscription and notification model in which the NWDA subscribes to certain events at network entities, and gets a notification when the event happens; or (2) a request and response model in which the NWDA sends request message to network entities for querying information, and gets the response accordingly.

Figure 17:
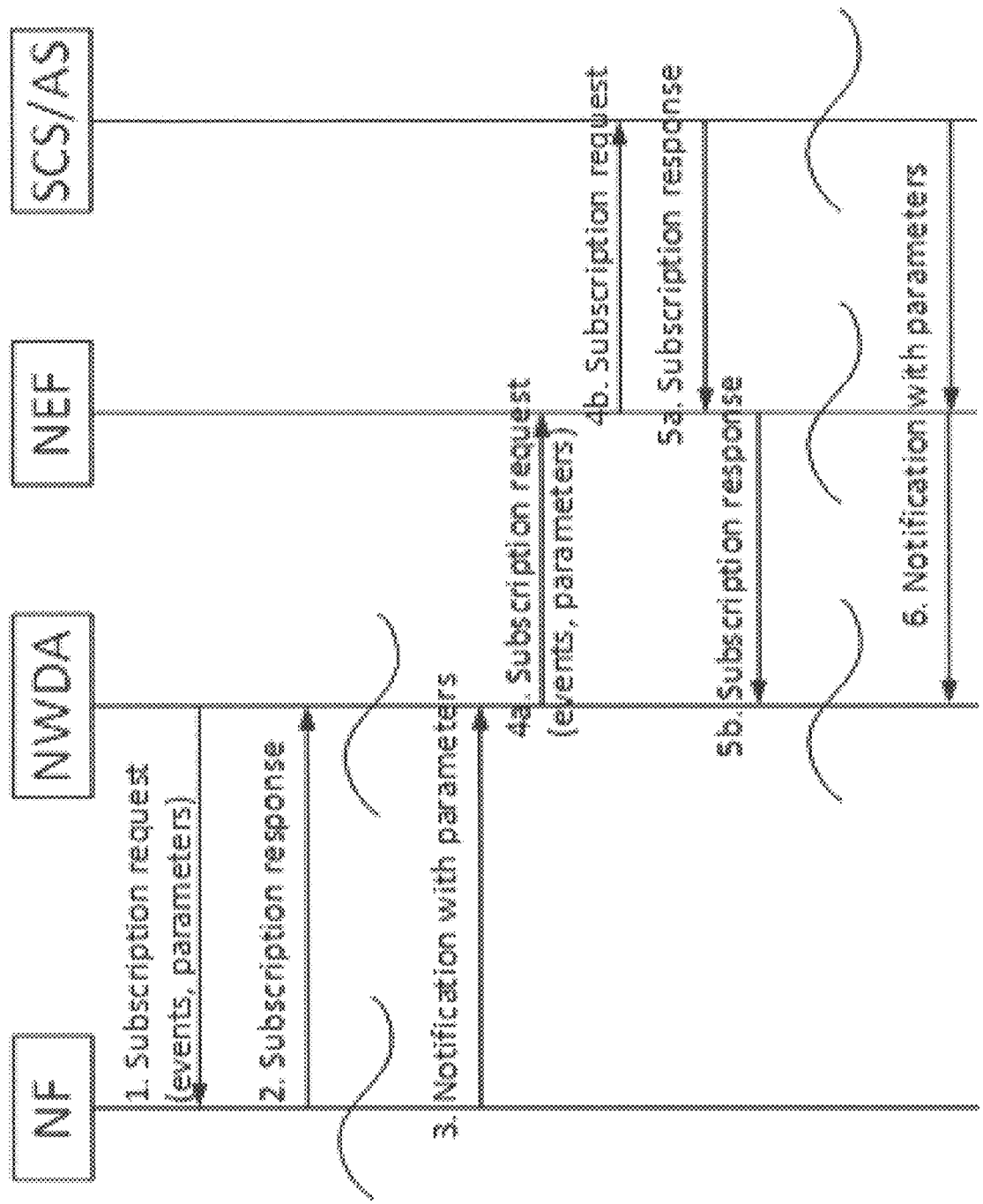
FIG. 17 illustrates a mechanism by which an NWDA may collect information for analytics through a subscription/notification model.

FIG. 17 illustrates one embodiment of a method by which the NWDA collects information for analytics through a subscription/notification model. In this embodiment, to make a subscription at the SCS/AS, the NEF is involved as an intermediate entity for the message forwarding. The method of FIG. 17 may be triggered by one or more of the following events:

1. The NWDA may subscribe to the NRF to be notified when certain NF types connect to the slice. For example, the NWDA may always want a certain type of information from the AMF (or PCF, or DSF, or SMF, or UPF, or NEF/SCS/AS). The subscription may depend on the NF supporting certain features; for example, the subscription may be configured to send the notification to the NWDA only if the NF supports collecting and sharing certain analytics information. When the NWDA receives a notification that the NF is available, the method of FIG. 17 may be used by the NWDA to subscribe to certain information from the NF.

2. The NWDA may receive configuration commands from a graphical user interface (GUI), an Operation and Management (O&M) system, or the NEF directing it to begin collecting certain types of information or generating certain types of analytics information.
3. The NWDA may receive updated policy information from the PCF. The updated policy may indicate that the NWDA should begin collecting certain types of information or generating certain types of analytics information.
4. The NWDA algorithms may determine that additional information is needed in order to provide the required information, e.g. obtain a higher level of accuracy.
5. NWDA receives external requests for new analytics functionality from the NEF.
6. NWDA may be notified by AMF or Network Slice Selection Function (NSSF) that a new network slice is created or configuration of an existing network slice is updated.

Referring to FIG. 17, in step 1, the NWDA sends a subscription request to an NF to subscribe to certain events. The NF may be a DSF, AMF, SMF, or UPF. In the request, the NWDA may indicate different types of subscribed events with the desired parameters. In one embodiment, the NWDA may subscribe to the following events at a SMF:

1. A new PDU session is created by the SMF with the following information:
   a. Type of the PDU session, e.g., IP or non-IP (i.e., unstructured)
   b. Session ID
   c. QoS parameters, such as Guaranteed Flow Bit Rate (GFBR), Maximum Flow Bit Rate (MFBR), and per Session Aggregate Maximum Bit Rate (Session-AMBR)
2. An existing PDU session is removed
3. A new QoS flow is inserted to an existing PDU session, with QoS flow ID and session ID are included
4. An existing QoS flow is removed from a PDU session
5. A connection (i.e., N16 connection) to SMF in H-PLMN (or V-PLMN) is established for home-routed roaming scenario
6. Downlink data buffered at SMF is dropped due to timeout threshold or limited storage. This could be per session, per UE or per SMF
7. The SMF is selected as an intermediate SMF for handling the session management for local data network
8. UPF is relocated for the PDU session under SMF's management
9. The total number of (IP type and/or non-IP type) sessions supported by the SMF crosses a certain threshold
10. The total expected, or observed, (guaranteed) data rates on the sessions that are managed by the SMF crosses a certain threshold
11. Total number, or rate of, rejected or failed connection attempts passes a threshold. This could be further qualified to request a notification if the total number, or rate of, ejected or failed connection attempts with a particular cause value passes a threshold.
12. Computing resources are low
13. The number of UPFs that the SMF is managing exceeds a certain threshold.
14. The amount of downlink data buffered at the SMF exceeds a certain threshold. Or the utilization of the memory allocated for downlink data buffering exceeds a certain threshold.

With this event information from the SMF, the NWDA may be able to keep track of the different statistics, such as the SMF's load and downlink data storage. This statistic information may be provided to an AMF and used by the AMF when selecting an SMF or by another SMF in roaming scenarios. The AMF could read this information from the NWDA during a PDU session establishment procedure and use it to select an SMF. In addition, the NWDA may combine this SMF load balance statistics with network slice information. For example, there may be 3 PDU sessions, each with a guaranteed bit rate 2 GB/s managed by SMFs in a network slice, so that the statistics may be used for selecting a network slice or deciding whether to create a new network slice.

If the NWDA detects conditions related to the number of failed connection attempts or connection attempts that result in an error, it may be indicative of a denial of service style attack and the NWDA may send a notification to a network administrator, or instruct the SMF to reject all new connections, all new connections that fall into a certain category or from certain users, or only allow new connections if they fall into a certain category or come from certain users.

In one embodiment, the NWDA may subscribe to the following events at an AMF:

1. A new NAS connection is created at AMF
2. An existing NAS connection is disabled at AMF
3. A new PDU session through control plane is created at AMF for small data service
4. An existing PDU session through control plane is disabled at AMF for small data service
5. A non-3GPP access is used to connect to the 5G core network, i.e., a connection between the AMF and Non-3GPP InterWorking Function (N3IWF) is created
6. The total number of connected UEs supported by the AMF crosses a certain threshold
7. Total number, or rate of, rejected or failed connection attempts passes a threshold. This could be further qualified to request a notification if the total number, or rate of, ejected or failed connection attempts with a particular cause value passes a threshold.
8. Computing resources are low.
9. The number of network slices that the AMF is serving as a common NF exceeds a certain threshold
10. The number of SMFs that the AMF is managing exceeds a certain threshold.
11. The number of non-3GPP access node that the AMF is serving exceeds a certain threshold.
12. The number of sessions for non-1P data delivery through the AMF exceeds a certain threshold.
13. The number of active registrations for UEs in IDLE state exceeds a certain threshold.

Given these events and information from the AMF, the NWDA is able to track the work load statistics of an AMF including NAS signaling, PDU session through control plane and non-3GPP access signaling via N3IWF.

If the NWDA detects conditions related to the number of failed connection attempts or connection attempts that result in an error, it may be indicative of a denial of service style attack and the NWDA may send a notification to a network administrator, or instruct the AMF to reject all new connections, all new connections that fall into a certain category or from certain users, or only allow new connections if they fall into a certain category or come from certain users.

In one embodiment, the NWDA may subscribe to the following events at a UPF:

1. DL data buffered at the UPF is dropped due to timeout threshold or limited storage. This could be per session, per UE or per UPF.
2. A UPF is selected as an uplink classifier for local data network or branching point for multi-homed PDU session. The UPF is responsible for routing the traffic.
3. A connection (i.e., N9 connection) to UPF in H-PLMN (or V-PLMN) is established for home-routed roaming scenario.
4. UPF is serving as the anchor point via 3GPP access or non-3GPP access (i.e., through N3IWF).
5. Policy rule is enforced on a particular traffic by the UPF, including the information of SCS/AS originating the traffic, and what specific rule is enforced.
6. The total number of connected UEs supported by the UPF crosses a certain threshold.
7. Total number, or rate of, rejected or failed connection attempts passes a threshold. This could be further qualified to request a notification if the total number, or rate of, ejected or failed connection attempts with a particular cause value passes a threshold.
8. Computing resources are low.
9. The total number of the sessions that the UPF is managing exceeds a certain threshold.
10. The total (guaranteed) data rates of the sessions that the UPF is managing exceeds a certain threshold.
11. The amount of downlink data buffered at the SW' exceeds a certain threshold. Or the utilization of the memory allocated for downlink data buffering exceeds a certain threshold.
12. The number of sessions without any traffic during a pre-configured time period exceeds a certain threshold Given these information from the UPF, the NWDA is able to track the traffic statistics through the user plane. For example, it may track what percentage of traffic going through the UPF is for roaming scenario, for non-3GPP access, or for local data network.

If the NWDA detects conditions related to the number of failed connection attempts or connection attempts that result in an error, it may be indicative of a denial of service style attack and the NWDA may send a notification to a network administrator, or instruct the UPF to reject all new connections, all new connections that fall into a certain category or from certain users, or only allow new connections if they fall into a certain category or come from certain users.

In one embodiment, the NWDA may subscribe to the following events at a PCF:
1. A new charging model/method is added, or an existing charging model/method is updated
2. A location related policy is updated
3. An Application Function (AF) requests to add or update some application related traffic routing policy
4. A QoS control policy is updated
5. An updated policy
6. The number of stored polices crosses a threshold.
7. The storage required to store polices crosses a threshold
8. A notification that the number of stored policies crosses a threshold, or the amount of storage required to store the polices crosses a threshold, then the NWDA may send an indication to the orchestration system to indicate that the storage allocated to the PCF needs to be scaled up or down accordingly.

Referring again to FIG. 17, in step 2, the target NF sends a response message to confirm the subscription.

Next, as illustrated in step 3, over time, when the subscribed event takes place, the NF sends a notification message to indicate the type of event, and the NF identity. Some more information may be provided as well to associate with the event. Therefore, the NWDA is able to analyze the data and generate statistics for different levels, such as per connection (e.g., PDU session or NAS connection), per slice, per NF or per UE.

As illustrated in steps 4a-4b, in order to subscribe to some events at the SCS/AS, the NWDA may send the subscription request to the NEF, which forwards the request to the targeted SCS/AS. In one embodiment, the NWDA may subscribe to the following events at an SCS/AS:
1. SCS/AS has subscribed or unsubscribed some event for event monitoring at network entities, with the event type.
2. SCS/AS successfully performs a group message delivery using MBMS, with number of UEs and device type of each UE.
3. SCS/AS changes one or more parameters of communication pattern.
4. SCS/AS successfully configures the background data transfer with the network entities
5. an application on a UE is triggered by SCA/AS using application triggering service in the core network
6. any twinning requirement or policy is updated by the SCS/AS for reducing control signaling Next, as illustrated in steps 5a-5b, the SCS/AS returns the response to confirm the subscription.

In step 6, when the subscribed event takes place, the SCS/AS notifies the NWDA with the event type and some related information. In this example, the NEF is used as an intermediate forwarding node.

Once the NWDA gets notification about the occurrence of the subscribed events and the related information, NWDA may trigger the data analytics process to update the statistics that may be impacted by the new piece of information. Alternatively, the NWDA may periodically perform the data analytics process to update the statistics based on the information received during the past time period.

Figure 18:
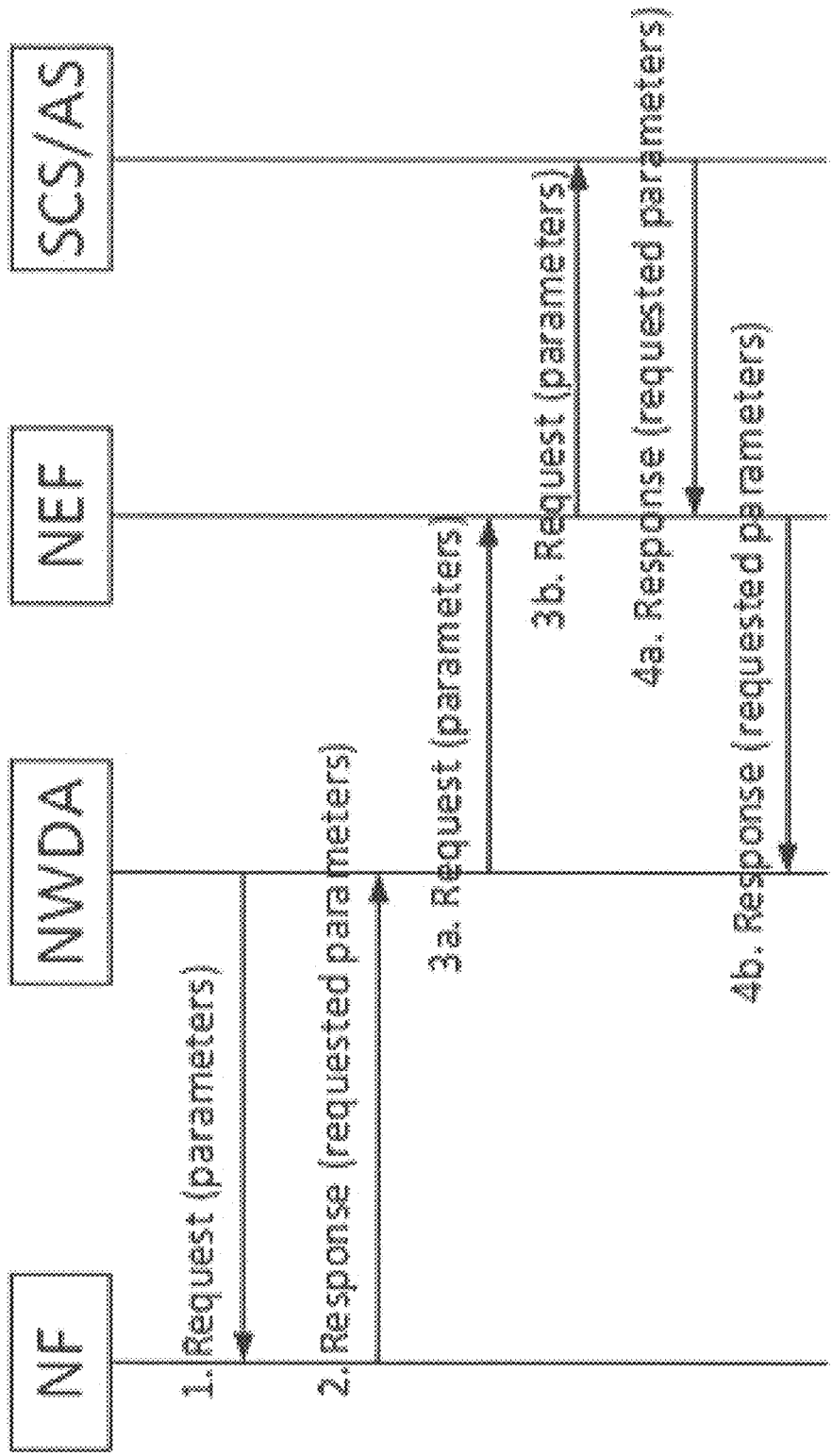
FIG. 18 illustrates another method for collecting information for data analytics in a 5G network.

FIG. 18 shows a method by which an NWDA collects information for data analytics by sending a request and receiving a response message. Compared with the subscription/notification model, the request/response model is more like a one-time information collection. To get the information from the SCS/AS, a NEF may be an intermediate entity for the message forwarding.

Referring to FIG. 18, in step 1, the NWDA sends the request message to the target NF. In one embodiment, the NWDA may request one or more of the following information from a SMF:
1. Number of active PDU sessions the SMF is managing. Specifically, the number of IP type, and number of non-IP type.
2. Number of PDU sessions that is guaranteed bit rate (GBR), and the maximum guaranteed bit rate for each of those sessions.
3. Number of UPFs the SMF is managing, including UPF as an anchor point, branching point or uplink classifier, respectively.
4. The number of N16 connections to another SMF that the SMF has for home routed roaming scenario
5. The amount of downlink data buffered at SMF for how many UEs, or for how many sessions NWDA may request the following information from an AMF:
1. The number of SMFs the AMF is managing.
2. The number of network slices that share the AMF in case the AMF is a common NF 3. The number of active NAS connections AIVIF maintains
4. The number of active registrations without NAS connection
5. The number of connections to 5G RAN nodes and 4G LTE RAN nodes respectively
6. The number of N2 connections with a N3IWF, i.e., the number of non-3GPP access nodes
7. The number of sessions through AMF for NIDD if any
8. The number of UEs under AMF's management in mobile originated only mode, or mobile initiated connection only mode
9. UE's connection quality for either 3GPP access or non-3GPP access. This could be provided by RAN to AMF, and not necessary to a specific UE.

NWDA may request the following information from a UPF:
1. Number of PDU sessions for which the UPF is serving as the anchor point, branching point or uplink classifier, respectively.
2. Amount of downlink data buffered at UPF for how many UEs, or for how many sessions
3. The number of N9 connections to another UPF that the UPF has for home routed roaming scenario
4. The number of N3 connections with a N3IWF, i.e., the number of non-3GPP access nodes
5. The amount of traffic that is denied due to policy rule enforcement
6. Number of application server or AF that are connecting to the UPF, i.e., N6 connection
7. The amount of traffic that is routed to the local data network influenced by the AF NWDA may request the following information from a PCF:
1. Number of policies that are configured by application function (AF) and SCS/AS.
2. Number of rules that are dynamically configured
3. Maximum number of UEs which a network slice is allowed to serve Referring still to FIG. 18, in step 2, upon receiving the request, the NF returns the response message including the requested information to the NWDA for further processing.

As illustrated in steps 3a-3b, the NWDA sends a request to the SCS/AS via the NEF for getting desired information. In one embodiment, the NWDA may request the following information from a SCS/AS:
1. The number of events which SCS/AS subscribes for monitoring
2. The number of external groups under SCS/AS management that connects to SC S/AS through the core network, and the group size
3. Amount of memory that SCS/AS requests for downlink data storage in core network entity
4. Traffic pattern supported by SCS/AS, such as non-IP data, UL only, etc. Note that, these traffic pattern information could be provided to NWDA by other NFs as well, such as SMF and NEF.
5. Twining information that can be applied to services/devices supported by the SAS/AS. Specifically, the twinning requirement or policy may be in terms of mobility pattern (e.g., stationary in the same tracking area), traffic pattern (e.g., small infrequent data via control plane), application/service information, or device profile that can be used to determine if devices or applications can be linked to one another.

As illustrated in steps 4a-4b, the SCS/AS returns the response message via NEF to NWDA. In one embodiment, it is possible that SCS/AS sends back a reference (e.g., URI) of data set to the NWDA. The reference may be used to access a data set which is associated with an ontology (i.e., vocabulary) and is maintained within core network (e.g., DSF), or in an external place. The NWDA may retrieve the data and perform the analytics. Similarly, NFs may send such a reference to the NWDA as well instead of direct data.

Note, it is possible that NFs and SCS/AS subscribe to the network data analytics information at the NWDA. In other words, notification may be sent out once the information is updated.

Methods of Provisioning Statistics

Disclosed hereinafter are new types of data analytics that could be requested by an SCS/AS and by NFs, or pre-provisioned by the NWDA. Also disclosed are methods of how an SCS/AS may obtain data analytics from NWDA via the NEF.

Other than a PCF, the NWDA described herein may provide new types of network data analytics to other NFs, mainly the Access and Mobility Management Function (AMF), Session Management Function (SMF) and User Plane Function (UPF).

In one embodiment, the NWDA may provide the following network data analytics to an AMF:
1. Average number of SMFs in a network slice, and the utilization of these SMFs
2. Average number of UEs that connect to a network slice
3. Average data rates carried by PDU sessions within a network slice
4. Average number of network slices that an AMF is serving as the common NF
5. Average number of PDU sessions that AMF serves for non-IP data delivery
6. Percentage of UEs that do not require mobility management, i.e., these UEs are fixed.
7. Number of different levels of mobility under an AMF or a network slice
8. Number of dropped connections by the RAN nodes connecting to the AMF
9. Number of successful or unsuccessful handovers which the AMF is involved NWDA may provide the following network data analytics to SMF:
1. Average number of PDU sessions managed by a SMF
2. Average number of QoS flows in a PDU session
3. Percentage of PDU sessions that are guaranteed bit rate, with the average Guaranteed Flow Bit Rate, and Maximum Flow Bit Rate for UL and DL respectively.
4. Percentage of PDU sessions that are non-IP (unstructured) type, how many are through AMF-NEF path.
5. Average utilization of a PDU session for carrying the traffic
6. Percentage of PDU sessions that apply the reflective QoS scheme
7. Percentage of PDU sessions that have a UL classifier or branch point NWDA may provide the following network data analytics to UPF:
1. Percentage of traffic that are denied due to policy rule enforcement
2. Utilization of each session, or session anchored at the UPF
3. Percentage of traffic routed to a local data network by the UPF as branching point
4. Amount of traffic routed to another UPF in H-PLMN or V-PLMN for home routed roaming 5. Utilization of memory for downlink data storage at UPF NWDA may provide the following network data analytics to PCF:
1. Average number of PDU sessions managed by a network slice
2. Average guaranteed bit rates under a network slice
3. Number of UEs connected to each of network slices
4. Number of QoS levels under each network slice Note, the above information may be per NF, per connection (e.g., PDU session, NAS connection), per network slice, or per PLMN, while it is also possible that the NWDA generates some UE specific analytics. This information could be per certain area/location, e.g., total number of guaranteed data rates within a registration area/service area, or per a group of NFs/UEs. In addition, based on the real-time network statistics, such as the above information, NWDA may provide some operation guidance and/or rules to NF. For example, NWDA may generate a network performance metric indicating that some PDU session anchored at a UPF is near overloaded, and it may send a message to SMFs not to select the UPF when creating a PDU session with high data rates or with a large amount of traffic. As another example, NWDA may notify the NS SF and AMF to select a network slice instance to serve those roaming UEs since it has more mobility management capabilities that are not used yet. The operation guidance and rules may be more dynamic than the policy maintained at a PCF, and may be changed more frequently compared with the policies in the PCF.

After generating any of the information above, the NWDA may send the information to a GUI, notify other NF's that the data is available, or send a request to a management and orchestration system to request that section NF's be scaled up or down. Scaling an NF up or down may entail requesting that more resources be allocated to an NF or that an NF be allowed to allocate more network resources e.g. by supporting more connections.

Figure 19:
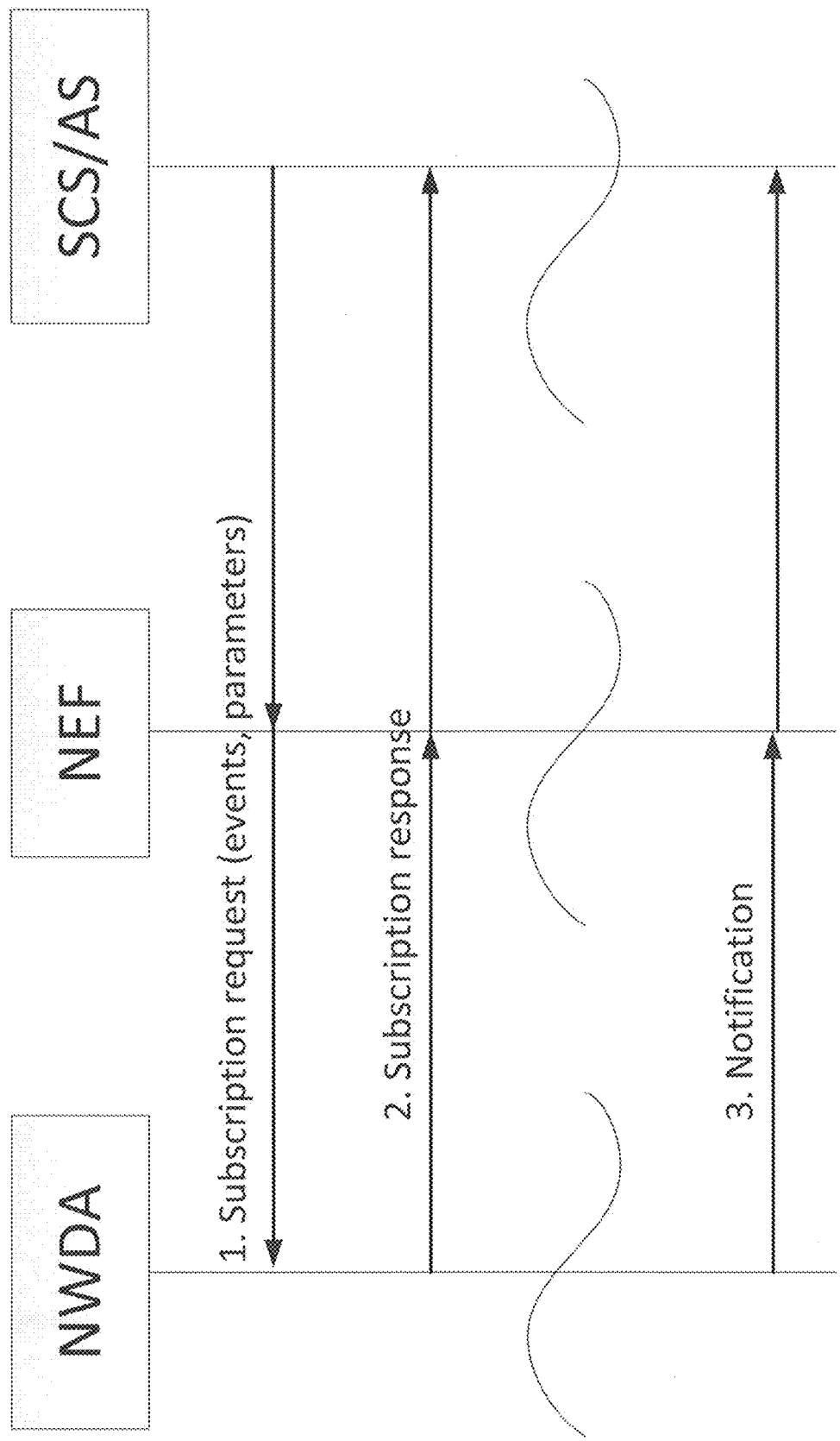
FIG. 19 illustrates a method for an SCS/AS to subscriber to certain network data analytics at an NWDA.

With different analytic data available at the NWDA, an SCS/AS (e.g., M2M server) may subscribe to some events pertaining to some types of statistics, so that the SCS/AS is notified to improve the service provisioning as the subscribed event takes place. Specifically, the subscription and notification message may be sent via a NEF between the NWDA and the SCS/AS. FIG. 19 illustrates one embodiment of this method.

As shown, in step 1, the SC S/AS sends a request message to NWDA for subscribing to certain events. In particular, the SCS/AS may be interested in the following network data analytics:
1. Utilization of PDU session for transferring the application data from/to SCS/AS
2. Achieved QoS parameters for transferring data from/to SCS/AS; achieved QoS may consist of an indication of the average observed delay or worst observed delay for packets that originate from a particular SCS/AS or IP address or are directed towards a particular UE or IP address.
3. SCS/AS may be interested in a combination of events and information, which may be known only to the NWDA from different network entities. For example, SCS/AS may subscribe to an event that the total aggregated uplink data rates exceed a certain threshold for UEs that located within a geographic area (e.g., tracking area or registration area). The aggregated rate comes from SMF/UPF, while the location information comes from AMF.
4. Number of UEs registered to SCS/AS that are roaming
5. Number of QoS levels for serving the UEs registered to SCS/AS, and the percentage of traffic mapped to each of QoS levels
6. Percentage of UEs that are entering power saving mode periodically, and the average duty cycle In step 2, the NWDA returns the response message to confirm the subscription.

As illustrated in step 3, at some point in time thereafter, when the event takes place or the subscribed information is updated, the NWDA sends notification to the SCS/AS including the subscribed information or the updated information In another embodiment, the request/response model may be employed instead of the subscription model. In that alternative embodiment, the method may be similar to that illustrated in FIG. 18, where the SCS/AS sends a request message to the NEF, which forwards the message to the NWDA for obtaining the desired analytics information. Alternatively, the NEF could perform a subscription on behalf of the SCS/AS.

Achieved QoS information may be useful to an SCS/AS in the scenario where packet delay needs to be kept to a minimum. When the delay is observed to increase, it may be desirable to trigger changing from a UPF that is farther to a UPF that is closer to the UE or the server that the UE is communicating with. This change of UPF may be triggered by the NWDA or a request from the SCS/AS that is routed via the NEF.

NWDA Interaction with NF Repository Function (NRF)

According to another aspect disclosed herein, during the network configuration phase, the NWDA may register with the NRF and provide the available types of data analytics, so that any network function is able to discover what types of data analytics are available through a discovery process with the NRF.

One possible benefit with this approach is that any NF, even in a different PLMN, may quickly find out the available types of network data analytics without communicating directly with the NWDA. The discovery interface or API with NRF may be unified and standard for all network entities.

Figure 20:
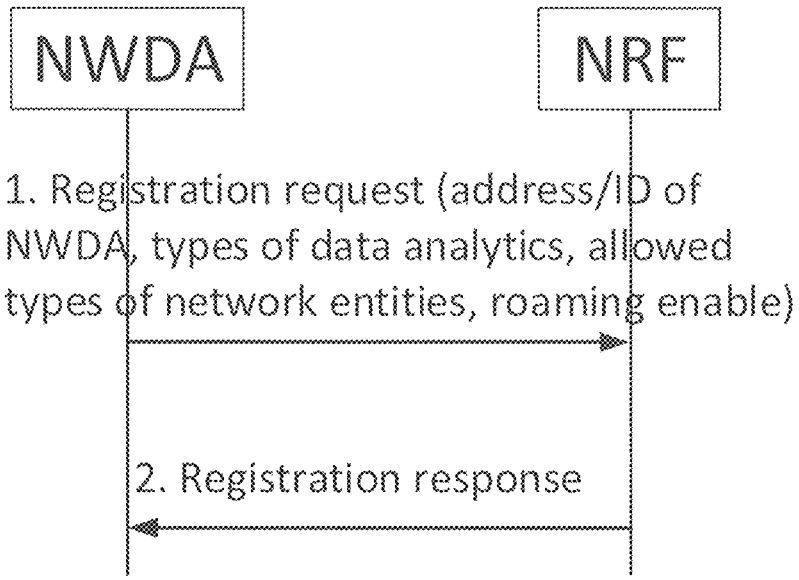
FIG. 20 illustrates a method for an NWDA to register with an NRF.

FIG. 20 illustrates one embodiment of a method by which the NWDA may register with the NRF, including providing specific information for discovery.

As shown, in step 1, the NWDA sends a registration request to NRF to declare that network data analytics is available as a network service within the core network. In one embodiment, the request may include the following information:
1. ID of NWDA, e.g., IP address of NWDA
2. Types of network entities (e.g., AMF, SMF, or SCS/AS) that are allowed to access the network data analytics service
3. Types of network data analytics which NWDA can provide. For example, the network data analytics information discussed above.
4. Condition for accessing certain types of network data analytics mentioned above. NWDA may put some limitation on accessing certain types of data analytics. As one example, the slice specific network data analytics is available to not only a PCF but also an AMF. However, a limitation may be that these NFs have to be in the H-PLMN. Another example is that the load balance statistics of a SMF may be available to any AMF in both H-PLMN and V-PLMN, but load balance statistics for AMF in V-PLMN may be only per SMF and not per session/UE.

5. Location where the network data analytics is stored by NWDA. NWDA may store the data analytics at a data storage function. As one example, the location information may be represented as a URI to access the DSF for retrieving the analytics data.

Next, in step 2, the NRF sends a response message to NWDA to indicate if the registration request is accepted or not.

With NWDA registered to NRF, other NFs and SCS/AS are able to discover what types of network data analytics are available. This may be done by performing an NF discovery procedure to discover NWDA and the available types of network data analytics.

According to another aspect, the NWDA may also update the types of network data analytics it provides with the NRF if it provides a new type of network data analytics or discontinues a type of network data analytics. It is also possible that the NWDA adds or removes some conditions on the data analytics provisioning.

In one embodiment, the update procedure may be triggered by one of the following events:
1. A new NF registers in the core network, and thus some new types of data is available to NWDA to generate some new type of network data analytics.
2. A new SCS/AS registers, provides some new types of data, and asks for new type of statistics from NWDA.
3. Network operator configures some new policy about network data analytics provisioning, e.g., a new service provider (i.e., SCS/AS) is allowed to retrieve the data analytics, or NFs in another PLMN is allowed to retrieve the data analytics due to the new partnership between operators.

Figure 21:
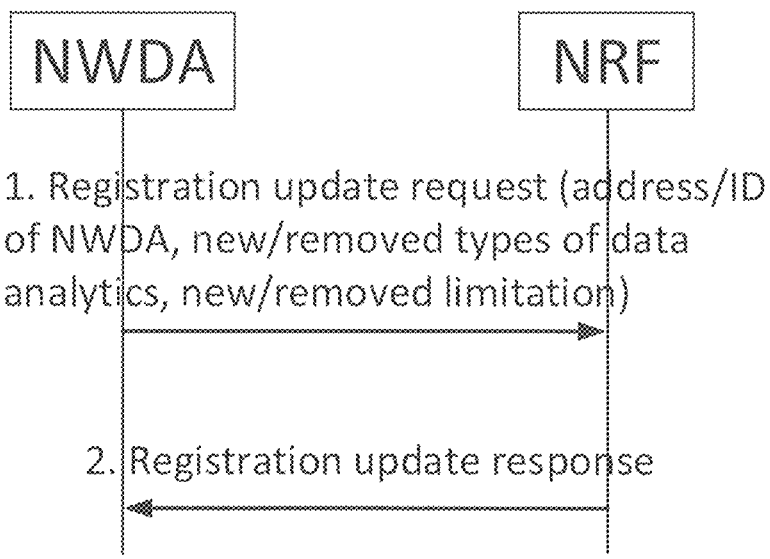
FIG. 21 illustrates a method for NWDA to updates its registration with an NRF.

FIG. 21 illustrates one embodiment of a method by which the NWDA may update the available types of data analytics, limitation for data analytics provisioning, or both.

In step 1, the NWDA sends an update request to the NRF. In the request message, the NWDA may indicate whether it wants to add, remove or modify a type of network data analytics, or some conditions associated with accesses to a certain type of data analytics.

In step 2, the NRF confirms the update operation to the NWDA.

Similar to the method illustrated in FIG. 20, it is also possible that the NFs provide the available types of event and information (e.g., those mentioned above) for network data analytics when registering with the NRF, so that the NWDA may obtain this information when registering with the NRF.

In addition, when an NF is instantiated, it will register with NRF. As a result, the NF will know that there is a NWDA, and what events and information the NWDA is interested in. Therefore, the NF may send information at an instance in time or periodically.

Storing Network Data Analytics in DSF

According to another aspect disclosed herein, an NWDA may store analytics data in a data storage function (DSF) of the network, so that other NFs and the SCS/AS may retrieve analytics data from the DSF, instead of obtain the analytics data form the NWDA itself. In the proposed 5G core network, a data storage function (DSF) is defined based on the concept of separating the computing capability from the storage capability in order to enable a service based architecture. As mentioned above by way of background, both structured DSF (SDSF) and unstructured DSF (UDSF) are defined currently by the 3GPP. The methods described hereinafter may be considered as a complementary method for NFs and the SCS/AS to access the network data analytics.

By storing the analytics data separately in a DSF, any NF or AS that is interested in the analytics data is not required to interact directly with the NWDA. They can directly retrieve the analytics data from a DSF as long as they are allowed to do so. This is especially convenient for the roaming scenario if a management application running in a UE wants some analytics data. Moreover, network data analytics can be provided as a service, and an external entity can get the data directly from a DSF without knowing or contacting the NWDA in the core network.

Figure 22:
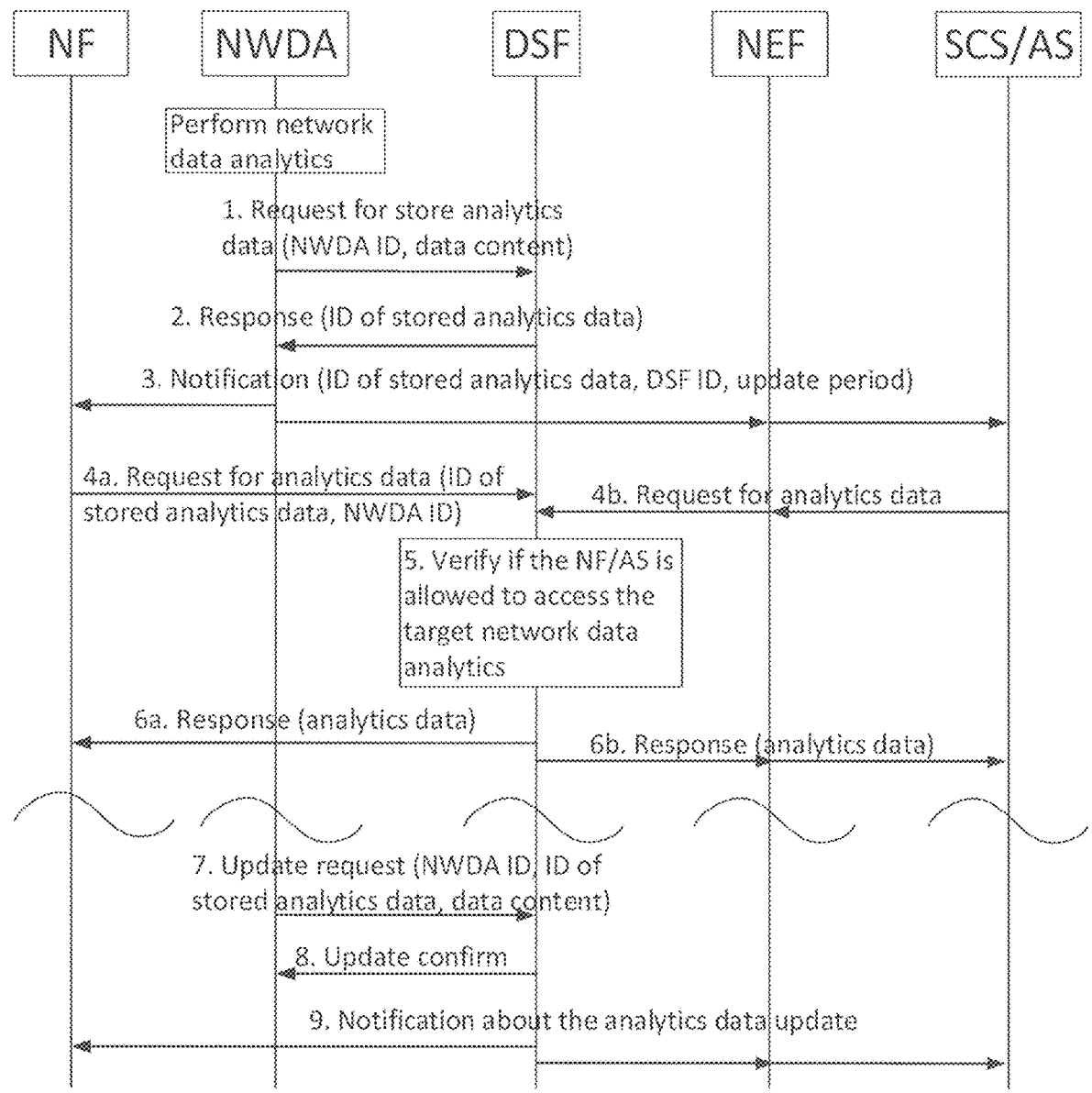
FIG. 22 illustrates a method for storing network data analytics in a DSF.

FIG. 22 illustrates one embodiment of a method of storing network data analytics in a DSF. As shown, in step 1, after performing network data analytics, the NWDA may send a request to a DSF to store the generated analytics data.

Next, in step 2, the DSF may verify the data storage request and store the data content. The response may be returned with an identifier (ID), such as a uniform resource indicator (URI) or uniform resource locator (URL) of the stored data content. This ID can help to access the data since there may be a large amount of data stored at the DSF from different data providers.

In step 3, upon receiving a response, the NWDA may notify some NFs and/or the SCS/AS about the new network data analytics, and may provide the ID to access the data in the DSF. The ID may be used by NFs or the SCS/AS to obtain the data analytics from the DSF.

As illustrated in FIGS. 4a-4b, the NF and/or SCS/AS may send a request to the DSF for retrieving the new data analytics. Alternatively, the NFs and/or SCS/AS may also subscribe to get updates on the analytics data. The request message may contain the following information:
1. ID of the network data analytics stored in DSF
2. NWDA ID to indicate the data analytics provider As illustrated in step 5, upon receiving the request, the DSF may verify if the requestor is allowed to access the target network data analytics. If the DSF does not have the capability to do so or have enough information for the access control verification, the DSF may resort to the NWDA or UDM for help.

In step 6, if the access control check is passed, the DSF returns a response including the desired network data analytics to the requesting NF and/or SCS/AS.

As illustrated in step 7, sometimes, the NWDA may generate new statistics based on the latest information it collects, and the NWDA may send an update request to the DSF.

In step 8, the DSF updates the data set accordingly and returns a response for confirmation.

In step 9, the DSF may notify the interested NFs and/or SCS/AS about the analytics update if subscriptions were previously made or in response to requests for retrieving the latest network data analytics in the DSF. Alternatively, the NWDA may send out the notification directly to an NF or the SC S/AS.

Creating Composite Data Analytics

According to yet another aspect, in some cases, the network entities, the SCS/AS, or the UE may want to request that the NWDA perform an enhanced data analytics by linking or stitching together already supported data analytics. This may be extremely useful in cases where the network may not want to expose the individual data analytics to the SCS/AS but may be ok with exposing the linked information. For example, an operator may not want to expose the location of its UEs, but may be willing to monitor the location of these UEs and send a notification to the SCS/AS if the UEs are in a certain location and if one of them has uplink traffic that flows through a certain UPF.

Figure 23:
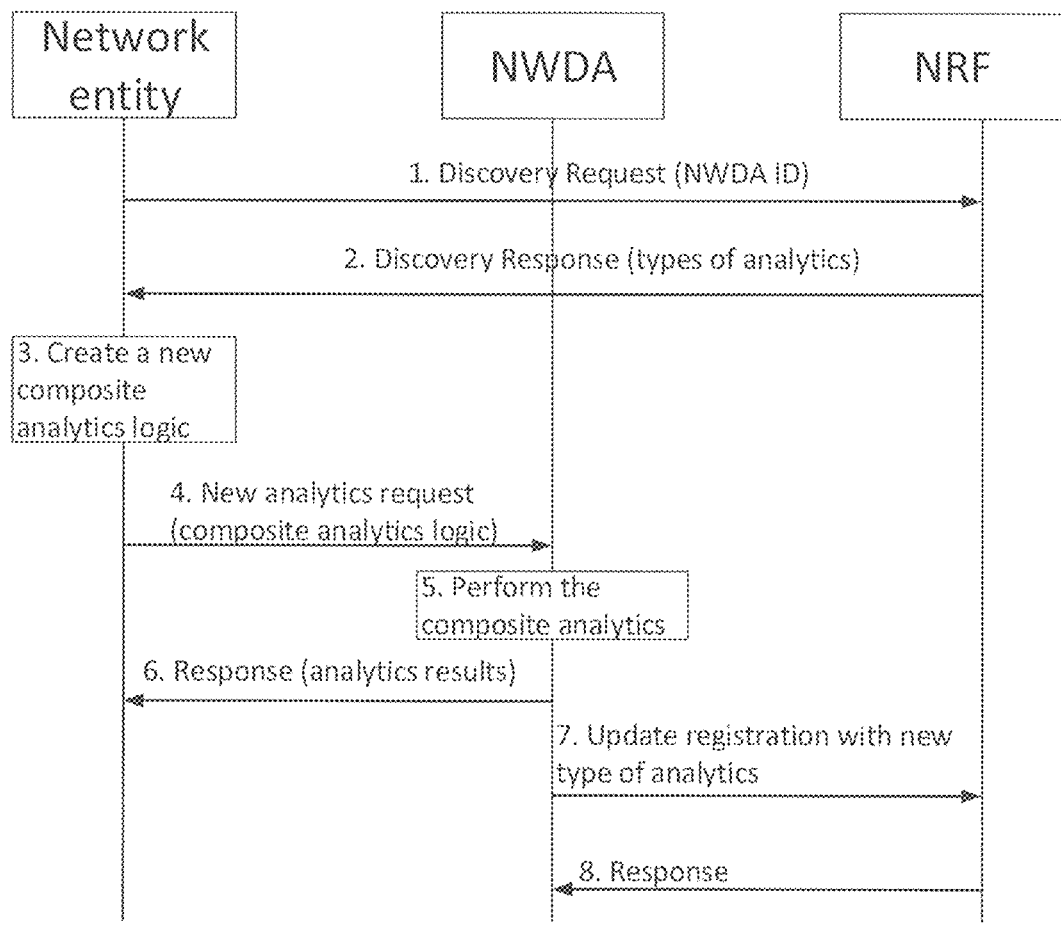
FIG. 23 illustrates a method for performing composite data analytics.

FIG. 23 illustrates one embodiment of a method for providing composite data analytics upon request.

As shown in step 1, a network entity (e.g. NF, SCS/AS, or UE), discovers the data analytics that are provided by the network. The entity may send a discovery request to the NRF to find out what types of analytics the NWDA is capable of providing.

In step 2, the network responds with the list of supported data analytics, e.g., data analytics 1 (DA1), DA2, DA3, etc.

In step 3, the network entity (e.g. NF, SCS/AS, or UE) creates a composite data analytic logic, for example using If/Then constructs and Boolean logic. For example, the composite data analytic logic may have the form: DA3 If (DA1>thresh1) AND (DA2 Level 1).

In step 4, the definition of the new composite data analytic logic is sent to the NWDA via the analytics request message.

In step 5, the NWDA performs the requested data analytics, and in step 6, the NWDA returns the analytics results to the network entity.

In step 7, the NWDA updates the NRF with the new composite data analytic that is being provided, so that this new composite data analytics can be exposed during the discovery procedure.

In step 8, the NRF may return a response to confirm the update.

As discussed above, the NWDA may provide network data analytics as a service to NFs and SCS/AS. An example definition for such as service may be as set forth in Table 1.

TABLE 1

Services Provided by the NWDA

| Service Name | Description | Example Consumer | Mechanism |
|---|---|---|---|
| Network data analytics provisioning | NWDA provides network data analytics and other statistics to NFs as well as SCS/AS | SCS/AS | Request/ Response, Subscription/ Notification |

As also discussed above, the NWDA may obtain various information for generating network data analytics. Specific to the AMF, an example definition for this new service may be as set forth in FIG. 2. Note that, similar services may be defined for the SMF, UPF and other NFs for network data analytics.

TABLE 2

Services Provided by the NWDA

| Service Name | Description | Example Consumer | Mechanism |
|---|---|---|---|
| Information provisioning for Network data analytics | AMF provides certain information to NWDA, so that NWDA is able to generate various types of network data analytics | NWDA | Request/ Response, Subscription/ Notification |

Each of the entities performing the steps illustrated in FIGS. 16-23, such as the NWDA, NF, AMF, SMF, NRF, UPF, SCS/AS, NEF, NRF, DSF, PCF, and the like, may be logical entities that may be implemented in the form of software (i.e., computer-executable instructions) stored in a memory of, and executing on a processor of, an apparatus configured for wireless and/or network communications or a computer system such as those illustrated in FIG. 10 or FIG. 15. That is, the method(s) illustrated in FIGS. 17-23 may be implemented in the form of software (i.e., computer-executable instructions) stored in a memory of an apparatus, such as the apparatus or computer system illustrated in FIG. 10 or FIG. 15, which computer executable instructions, when executed by a processor of the apparatus, perform the steps illustrated in FIGS. 17-23. It is also understood that the functionality illustrated in FIGS. 17-23 may implemented as a set of virtualized network functions. The network functions may not necessarily communicate directly, rather, they may communicate via forwarding or routing functions. It is also understood that any transmitting and receiving steps illustrated in FIGS. 17-23 may be performed by communication circuitry of the apparatus/entity under control of the processor of the apparatus and the computer-executable instructions (e.g., software) that it executes.

Figure 24:
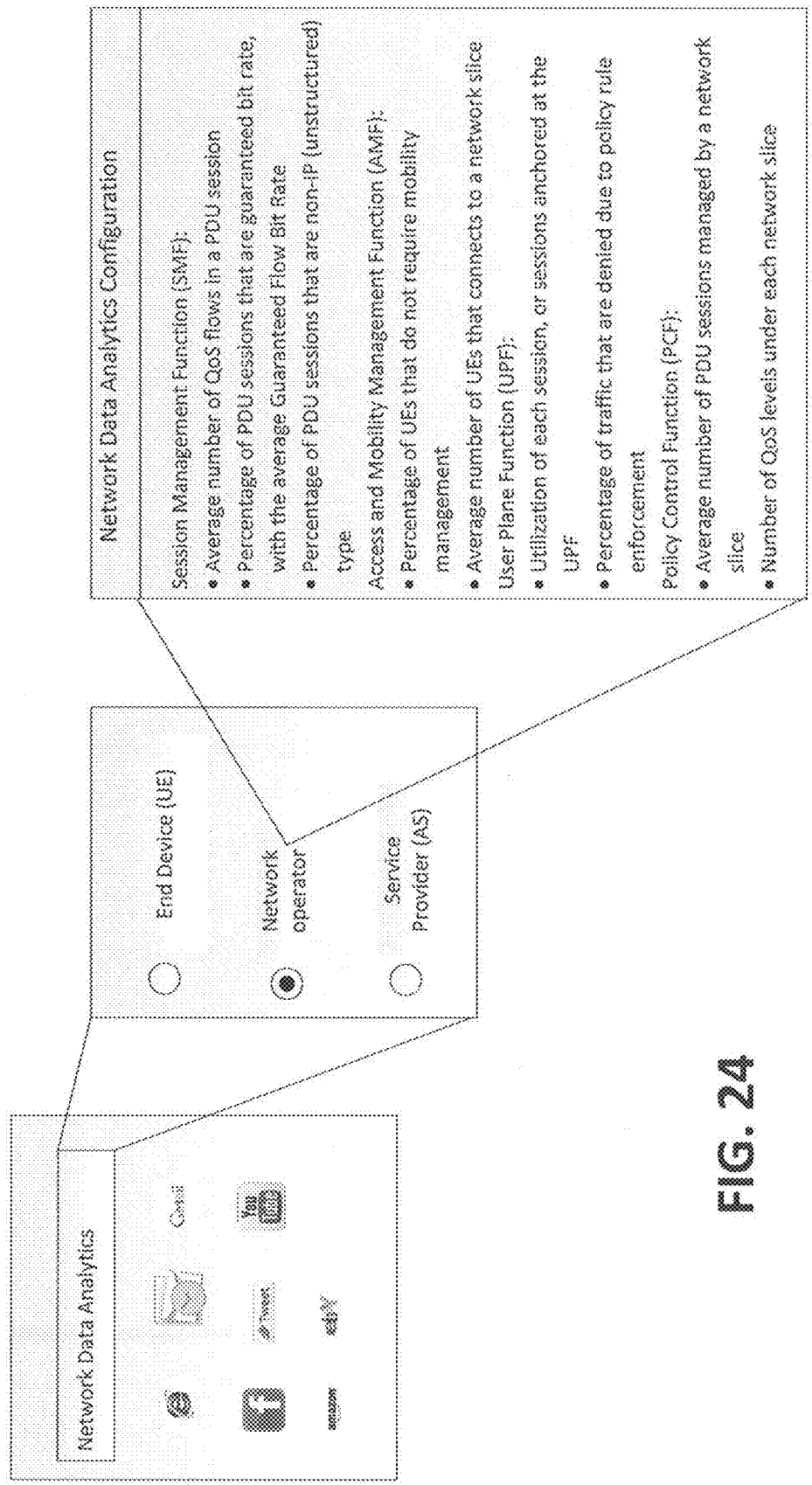
FIG. 24 shows an example user interface that can be used by a network operator, service, or UE to configure an NWDA service in the core network.

According to yet another aspect, a network operator (i.e., provider of the mobile core network), a service provider (i.e., SCS/AS) and/or a UE may be equipped to configure the network data analytics function described herein, for example so as to specify what types of events and analytics the entity may wish to subscribe or provide. FIG. 24 illustrates one example of a user interface that can be used by or displayed by a network operator, service provider or UE to enable the NWDA service described herein to be configured in the core network. For example, at any one of the logical entities illustrated in FIGS. 16-23, the graphical user interface illustrates in FIG. 24 may be displayed on a display, such as the display 128 of FIG. 10 or display 86 of FIG. 15 of an apparatus implementing that logical entity.

The illustrations of the aspects described herein are intended to provide a general understanding of the structure and operation of the various aspects. The illustrations are not intended to serve as a complete description of all of the elements and features of apparatuses and systems that utilize the structures or methods described herein. Many other aspects may be apparent to those of skill in the art upon reviewing the disclosure. Other aspects may be utilized and derived from the disclosure, such that structural and logical substitutions and changes may be made without departing from the scope of the disclosure. Accordingly, the disclosure and the figures are to be regarded as illustrative rather than restrictive.

The description of the aspects is provided to enable the making or use of the aspects. Various modifications to these aspects will be readily apparent, and the generic principles defined herein may be applied to other aspects without departing from the scope of the disclosure. Thus, the present disclosure is not intended to be limited to the aspects shown herein but is to be accorded the widest scope possible consistent with the principles and novel features as defined by the following claims.

What is claimed:

1. A method performed by a first network function (NF), the method comprising:
sending, using one of a request/response model or a subscription model, a discovery request to a Network Repository Function (NRF) to be notified when one or more network functions connect to a network slice, wherein the discovery request comprises information indicating at least one of a network function type or an analytics information type;

receiving one of a discovery response or notification from the NRF, wherein the one of the discovery response or notification comprises an identity of a second NF;

sending, using one of a request/response model or a subscription model, a second request to the second NF to provide mobile network status data maintained or monitored by the second NF;

receiving one of a response or notification from the second NF, wherein the one of the response or notification comprises the mobile network status data;

generating, based on the received mobile network status data, network statistics; and sending the network statistics to a third NF.

2. The method of claim 1, wherein the second NF is one of an access and mobility management function (AMF), a session management function (SMF), a user plane function (UPF), or a policy control function (PCF).

3. The method of claim 1, wherein
the second NF is an access and mobility management function (AMF), and
wherein the second request comprises a request to be notified when a UE's location is changed, or when a UE's connection is created or disabled, or when the UE uses a certain type of access network to access a core network, or when the UE changes the type of access network to access the core network.

4. The method of claim 1, wherein
the second NF is an application function (AF), and
the second request is sent to the AF through a network exposure function (NEF).

5. The method of claim 1, wherein
the second NF is a session management function (SMF), and
the second request comprises a request to be notified when a UE establishes a PDU session of an indicated type, when a UE's PDU Session is disabled, when a new QoS flow is added to a PDU session, when a buffered packet is dropped, when a UPF associated with a UE's PDU session changes, or when the amount of data that is buffered exceeds a threshold.

6. The method of claim 1, wherein the mobile network status data comprises at least one of information indicating that a total number, or rate, of rejected or failed connection attempts meets or exceeds a threshold; information indicating QoS provisioning parameters at a session management function (SMF); information indicating that a utilization of memory allocated for downlink data buffering at the SMF meets or exceeds a threshold; information indicating that a number of network slices that an access and mobility management function (AMF) is serving as a common network function (NF) meets or exceeds a threshold; information indicating a number of non-3GPP access nodes connected to the AMF or a user plane function (UPF); information indicating an amount of traffic that is denied due to policy rule enforcement at the UPF; or communication pattern, traffic pattern and mobility pattern information from a Service Capability Server or Application Server (SCS/AS).

7. The method of claim 1, wherein the generated network statistics comprise network function load information, which further includes utilization of computing resource and memory storage.

8. The method of claim 1, wherein the generated network statistics comprise at least one of a number of different levels of mobility under an access and mobility management function (AMF) or a network slice; an average number of network slices that an AMF is serving as a common network function (NF); a percentage of packet data unit (PDU) sessions that are of a non-IP type; a number of PDU sessions that are through an AMF-network exposure function (NEF) path; a percentage of PDU sessions that apply a reflective QoS scheme; or a percentage of PDU sessions that have a UL classifier or a branch point.

9. The method of claim 1, wherein the generated network statistics are generated per user equipment (UE), per UE group, per network slice, per packet data unit (PDU) connection, per application server (AS), or per area.

10. The method of claim 1, wherein the mobile network status data received by the first NF is received per user equipment (UE), per UE group, per network slice, per packet data unit (PDU) connection, per application server (AS), or per area.

11. The method of claim 1, further comprising generating, based on the received mobile network status data, network operation guidance and rules.

12. The method of claim 11, wherein the mobile network status data is sent to one of an access and mobility management function (AMF), a session management function (SMF), a user plane function (UPF), or a policy control function (PCF).

13. The method of claim 1, further comprising:
storing, at a data repository function of a mobile network dedicated for analytics data storage, at least a portion of the generated network statistics;
obtaining an identifier (ID) associated with at least a portion of the generated network statistics stored at the data repository function;
receiving, from a fourth NF, a request for the at least a portion of the generated network statistics; and
sending, to the fourth NF, the identifier associated with the requested at least a portion of the generated network statistics, whereby the third NF may use the identifier to obtain the at least a portion of the generated network statistics directly from the data repository function.

14. A computing device implementing a first network function (NF) and comprising one or more processors and memory storing instructions that, when executed by the one or more processors, cause the first network function (NF) to perform operations comprising:
sending, using one of a request/response model or a subscription model, a discovery request to a Network Repository Function (NRF) to be notified when one or more network functions connect to a network slice, wherein the discovery request comprises information indicating at least one of a network function type or an analytics information type;
receiving one of a discovery response or notification from the NRF, wherein the one of the discovery response or notification comprises an identity of a second NF;
sending, using one of a request/response model or a subscription model, a second request to the second NF to provide mobile network status data maintained or monitored by the second NF;
receiving one of a response or notification from the second NF, wherein the one of the response or notification comprises the mobile network status data;
generating, based on the received mobile network status data, network statistics; and
sending the network statistics to a third NF.

15. The computing device of claim 14, wherein the second NF is one of an access and mobility management function (AMF), a session management function (SMF), a user plane function (UPF), or a policy control function (PCF).

16. The computing device of claim 14, wherein
the second NF is an access and mobility management function (AMF), and
the second request comprises a request to be notified when a UE's location is changed, or when a UE's connection is created or disabled, or when the UE uses a certain type of access network to access a core network, or when the UE changes the type of access network to access the core network.

17. The computing device of claim 14, wherein
the second NF is an application function (AF), and
the second request is sent to the AF through a network exposure function (NEF).

18. The computing device of claim 14, wherein
the second NF is a session management function (SMF), and
the second request comprises a request to be notified when a UE establishes a PDU session of an indicated type, when a UE's PDU Session is disabled, when a new QoS flow is added to a PDU session, when a buffered packet is dropped, when a UPF associated with a UE's PDU session changes, or when the amount of data that is buffered exceeds a threshold.

19. The computing device of claim 14, wherein the mobile network status data comprises at least one of information indicating that a total number, or rate, of rejected or failed connection attempts meets or exceeds a threshold; information indicating QoS provisioning parameters at a session management function (SMF); information indicating that a utilization of memory allocated for downlink data buffering at the SMF meets or exceeds a threshold; information indicating that a number of network slices that an access and mobility management function (AMF) is serving as a common network function (NF) meets or exceeds a threshold; information indicating a number of non-3GPP access nodes connected to the AMF or a user plane function (UPF); information indicating an amount of traffic that is denied due to policy rule enforcement at the UPF; or communication pattern, traffic pattern and mobility pattern information from a Service Capability Server or Application Server (SCS/AS).

20. The computing device of claim 14, wherein the generated network statistics comprise network function load information, which further includes utilization of computing resource and memory storage.

21. The computing device of claim 14, wherein the generated network statistics comprise at least one of a number of different levels of mobility under an access and mobility management function (AMF) or a network slice; an average number of network slices that an AMF is serving as a common network function (NF); a percentage of packet data unit (PDU) sessions that are of a non-IP type; a number of PDU sessions that are through an AMF-network exposure function (NEF) path; a percentage of PDU sessions that apply a reflective QoS scheme; or a percentage of PDU sessions that have a UL classifier or a branch point.

22. The computing device of claim 14, wherein
the instructions further cause the first NF to generate, based on the received mobile network status data, network operation guidance and rules, and
the generated network statistics are generated per user equipment (UE), per UE group, per network slice, per packet data unit (PDU) connection, per application server (AS), or per area.

23. The computing device of claim 14, wherein the mobile network status data is sent to one of an access and mobility management function (AMF), a session management function (SMF), a user plane function (UPF), or a policy control function (PCF).

* * * * *